(12) United States Patent
Miyazaki et al.

(10) Patent No.: US 11,500,263 B2
(45) Date of Patent: Nov. 15, 2022

(54) OPTICAL MODULATOR AND OPTICAL MODULE USING THIS

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 17/256,394

(22) PCT Filed: Jun. 28, 2019

(86) PCT No.: PCT/JP2019/025882
§ 371 (c)(1),
(2) Date: Dec. 28, 2020

(87) PCT Pub. No.: WO2020/004636
PCT Pub. Date: Jan. 2, 2020

(65) Prior Publication Data
US 2021/0149268 A1 May 20, 2021

(30) Foreign Application Priority Data
Jun. 29, 2018 (JP) .............................. JP2018-124468

(51) Int. Cl.
*G02F 1/035* (2006.01)
*G02F 1/295* (2006.01)
(Continued)

(52) U.S. Cl.
CPC .............. *G02F 1/225* (2013.01); *G02F 1/212* (2021.01)

(58) Field of Classification Search
CPC ...... G02F 1/035; G02F 1/0147; G02F 1/3131; G02F 1/01; G02F 1/03; G02F 1/225; G02F 1/212; G02B 6/2773; G02B 6/32
(Continued)

(56) References Cited

U.S. PATENT DOCUMENTS

2018/0120670 A1* 5/2018 Doi ....................... G02F 1/3131

FOREIGN PATENT DOCUMENTS

| JP | 2003-233048 | 8/2003 |
| JP | 2006-41213 | 2/2006 |

(Continued)

OTHER PUBLICATIONS

International Search Report dated Sep. 24, 2019, Application No. PCT/JP2019/025882, 4 pages.

*Primary Examiner* — Kaveh C Kianni
*Assistant Examiner* — Hung Q Lam
(74) *Attorney, Agent, or Firm* — Rankin, Hill & Clark LLP

(57) ABSTRACT

An optical modulator has an optical modulation element including optical waveguides and a housing that accommodates the optical modulation element. The housing has a bottom surface wall having a quadrilateral shape in a plan view, first and second long side walls that are connected to two opposite edges of the bottom surface wall, and first and second short side walls, shorter than the long side walls, and connected to two other opposite edges of the bottom surface wall. The optical modulation element is accommodated in a space surrounded by the bottom surface wall and the side walls. The second long side wall has a wall thickness that is equal to or larger than that of the first long side wall, and at least one of the first and second short side walls has a wall thickness that is thinner than that of the first long side wall.

8 Claims, 13 Drawing Sheets

(51) Int. Cl.
*G02F 1/225* (2006.01)
*G02F 1/21* (2006.01)
(58) Field of Classification Search
USPC .......................................................... 385/1–8
See application file for complete search history.

(56) References Cited

FOREIGN PATENT DOCUMENTS

| | | |
|---|---|---|
| JP | 2007-065247 A | 3/2007 |
| JP | 2015-102786 | 6/2015 |
| JP | 2016-99508 | 5/2016 |
| JP | 2017-134131 | 8/2017 |

\* cited by examiner

OPTICAL MODULATOR AND OPTICAL MODULE USING THIS

TECHNICAL FIELD

The present invention relates to an optical modulator and an optical module that performs an optical communication operation using the optical modulator.

BACKGROUND ART

In recent years, the digital coherent transmission technology, which started to be applied to long-distance optical communication, also has been continuously applied to metro optical communication such as medium-distance and short-distance optical communication due to an additionally increasing communication demand. In such digital coherent transmission, dual polarization-quadrature phase shift keying (DP-QPSK) modulators in which a LiNbO3 (hereinafter, referred to as LN) substrate is typically used are used as optical modulators. Hereinafter, optical modulators in which a LiNbO3 substrate is used will be referred to as LN modulators.

Such an optical modulator is used in a state of being mounted in an optical module that performs an optical communication operation together with, for example, a driver integrated circuit (IC) that outputs an electric signal for causing the optical modulator to perform a modulation operation or a circuit board on which a digital signal processor (DSP) that processes a signal input from a higher-level device at a high speed and inputs transmission data to the driver IC is disposed.

In short-distance applications such as metro optical communication, there is a high demand particularly for the size reduction of optical modules, and, in the future, the mounting densities of optical components and electronic components in an optical module housing gradually increase due to an increasing demand for additional size reduction. As a result, it may be necessary to dispose a heat-generating electronic component such as a driver IC or a DSP extremely close to an optical modulator in an optical module housing.

Typically, a driver IC outputs high frequency signals having a voltage magnitude of several volts to several tens of volts and consumes approximately 1 W of electricity. In addition, a DSP that is used, particularly, in optical modules is an element (or a device) that processes signals of several tens to several hundreds of Mbs at a high speed and consumes approximately 10 to 30 W of electricity. In addition, the consumed power is emitted from the driver IC or DSP mainly as heat.

Meanwhile, optical modulators include an optical crystal (for example, the above-described LN) that is relatively sensitive to temperature in terms of characteristics and reliability in a housing (modulator housing) and accommodate an optical component requiring submicron-level positional accuracy.

Therefore, conventionally, in an optical module housing, an optical modulator and a heat-generating electronic component are disposed at positions that are as far apart as possible such that heat emitted from the heat-generating electronic component does not affect the optical modulator. In addition, in order to suppress the temperature of each portion in the optical module housing being raised by heat generated from the heat-generating electronic component, it is also proposed to dissipate heat from the heat-generating electronic component to the outside of the optical module by bringing the heat-generating electronic component into contact with the optical module housing directly or through a heat-dissipating gel (for example, Patent Literature 1).

However, as the size reduction of optical modules progresses, it is inevitable to dispose an optical modulator and a heat-generating electronic component close to each other, and there is a demand for an optical modulator capable of avoiding the degradation of characteristics and long-term reliability even in the case of being disposed close to a heat-generating electronic component.

As techniques for suppressing the degradation of the reliability of optical modulators or the like attributed to heat applied from the outside, for example, Patent Literature 2 discloses the reduction of the wall thickness of the housing between a feedthrough-fixed portion and an optical modulation element-fixed portion in order to prevent the occurrence of deterioration or breakdown in an optical modulation element in the housing due to heat generated at the time of fixing a feedthrough portion, into which an optical fiber is introduced, to the housing by soldering during manufacturing.

However, the configuration described in Patent Literature 2 is intended to prevent heat generated only in the fixation-by-soldering step during manufacturing and applied for an extremely short period of time of approximately several seconds to several tens of seconds from being transferred to the optical modulation element. This configuration is not a technique intended to enlighten a measure for preventing the fluctuation of optical characteristics attributed to heat that is continuously applied from the outside during operation of optical modulators or the degradation of long-term reliability attributed to heat that is continuously applied during the long-term operation of optical modulators.

Furthermore, usually, optical modulator housing are designed to have as uniform a wall thickness as possible from the viewpoint of ease of manufacturing or the avoidance of stress concentration during the fluctuation of the ambient temperature. In contrast, to a modulator housing of an optical modulator mounted in an optical module housing, unlike a case where heat is uniformly applied from all directions in association with the fluctuation of the ambient temperature, heat is often applied locally from a heat-generating electronic component.

FIG. 15 is a plan view schematically showing an example of the configuration of a conventional optical modulator. An optical modulator 1500 shown in the drawing includes, for example, an optical modulation element 1502 and a modulator housing 1504 that accommodates the optical modulation element 1502. The optical modulation element 1502 is, for example, a Mach-Zehnder optical modulator, which is a so-called interference type optical modulation element that operates using the interference of light by controlling the phase difference between parallel waveguides formed on a LN substrate.

In addition, the optical modulator 1500 includes an input optical fiber 1508 that inputs light to the optical modulation element 1502 and an output optical fiber 1510 that outputs light modulated by the optical modulation element 1502. The modulator housing 1504 usually has a substantially rectangular shape in a plan view and is configured in the same thickness that is large enough to secure necessary stiffness such that the respective wall thicknesses on the four edges become as uniform as possible.

In reality, since a lead pin, a relay board, or the like, not shown, for receiving a high frequency signal from the outside of the modulator housing 1504 and inputting the high frequency signal to the optical modulation element 1502 is mounted in the modulator housing 1504, a protrusion and a recess are provided on the inner surface portion of the wall as necessary. However, these protrusion and recess are provided in a limited range as necessary in order for the disposition of an auxiliary component and do not cause technically meaningful unevenness in the thicknesses of the four walls of the modulator housing 1504. It is necessary to understand that FIG. 15 schematically shows the modulator housing 1504 such that the wall thicknesses on the four edges are each the average thickness on the corresponding edge.

The conventional optical modulator 1500 is configured such that (the average value of) the wall thicknesses on the four edges of the modulator housing 1504 become substantially the same value t15 and has a structure that is symmetrical with respect to a center line 1520 with respect to the width direction and a center line 1522 with respect to the longitudinal direction. Therefore, in a case where heat from the ambient environment of the optical modulator 1500 is uniformly applied to the modulator housing 1504, the deformation of the modulator housing 1504 is suppressed in a minute range, and the degree of the fluctuation of the characteristics or the degradation of reliability is also suppressed. Here, the "average value" of the wall thickness refers to the average value of the thickness of the parts of the corresponding wall or wall, and, even in a case where the wall or a part of the wall is connected to or intersects an adjacent wall, the average value refers to the average value of the thickness of the so-called "wall" itself or the part of the "wall" itself, not including the connecting or intersecting part. For example, in a case where the inner surface of the corresponding wall or a part of the wall (the inside surface of the modulator housing) is connected to the inner surface of an adjacent wall through a curved portion (R-processed portion), the average value refers to the average value of the thickness of the "wall" itself or the part of the "wall" itself, excluding the curved portion.

However, in a case where the optical modulator 1500 is mounted in an optical module, heat propagating from a heat-generating electronic component disposed adjacent to the optical modulator 1500 usually propagates to a part of the modulator housing 1504 almost locally and diffuses toward the entire modulator housing 1504. Therefore, in the optical module, usually, heat is not uniformly applied to the modulator housing 1504.

FIG. 16 schematically shows a temperature distribution generated in the modulator housing 1504 in a case where the optical modulator 1500 is mounted on a circuit board 1602 of an optical module together with, for example, a DSP 1600, which is a heat-generating electronic component. Black/white shades shown over the modulator housing 1504 shown in the drawing indicate the temperatures of individual portions and indicate that, as the white shade becomes lighter, the temperature becomes lower, and, as the black shade becomes darker, the temperature becomes higher.

In the drawing, heat from the DSP 1600 disposed on the lower right side of the drawing on the circuit board 1602 mainly propagates through the circuit board 1602 and flows into the modulator housing 1504 from a portion that faces the DSP 1600 on a edge of the modulator housing 1504 on the lower side of the drawing. In addition, the heat that has flowed in from the portion propagates to the upper left side of the drawing toward the entire modulator housing 1504.

As a result, in the modulator housing 1504, a temperature gradient is generated such that the temperature decreases from the lower right side to the upper left side as shown in the drawing. Such a temperature gradient is not generated in a case where the temperature of the entire modulator housing 1504 changes in association with a change in the environmental temperature and is generated due to the fact that the DSP 1600 acts as an eccentric heat source that is positioned asymmetrically with respect to the modulator housing 1504. More specifically, this temperature gradient arises from the fact that the size of the DSP 1600 is usually smaller than the size of the modulator housing 1504 and the DSP 1600 is disposed close to a part of the edge of the modulator housing 1504.

In addition, as a result of the DSP 1600 acting as an asymmetric and eccentric heat source as described above, this temperature gradient is generated along a direction 1504 (the white broken line in the drawing) that is different from both directions of the center line 1520 with respect to the width direction and the center line 1522 with respect to the longitudinal direction of the modulator housing 1504 as shown in the drawing and generates an asymmetric temperature distribution in the modulator housing 1604.

Such an asymmetric temperature distribution in the modulator housing 1504 is significantly different from a temperature change that is expected by the design concept of the conventional modulator housing 1504, which is "making the wall thicknesses on the four edges the same to suppress deformation", that is, "a uniform temperature change" in the modulator housing 1504 and may cause characteristic fluctuations and the degradation of long-term reliability that are beyond designers' prediction.

For example, in an accelerated aging test for predicting the long-term reliability of electronic components and optical components regulated in industrial standards such as Telcodia or JIS, optical modulators, which are test objects, are put into constant-temperature baths set to a variety of temperatures (for example, 100° C., 125° C., and the like), respectively, and the amounts of characteristic fluctuations of the respective optical modulators are measured whenever predetermined elapsed times are reached. That is, what is predicted from such an accelerated aging test is long-term reliability in a case where the optical modulator 1500 is continuously used in a uniform temperature state. Therefore, the long-term reliability of an actual optical modulator 1500 where an asymmetric temperature distribution is generated in an optical module as described above may become significantly different from the above-described prediction.

In addition, due to the asymmetric temperature distribution in the modulator housing 1504, an asymmetric temperature distribution is also generated in the surface of a substrate that configures the optical modulation element 1502. Therefore, particularly, in a case where an interference type optical modulation element such as a Mach-Zehnder optical modulator is used as the optical modulation element 1502 as described above, mutually different additional phase differences that are attributed to the asymmetric temperature distribution are generated between parallel waveguides adjacent to each other on the substrate, and the characteristics and reliability of the optical modulation element 1502 itself may also be adversely affected. That is, in an optical modulator in which an interference type optical modulation element is used, due to an asymmetric temperature distribution that is generated over a long period of time by the disposition of the optical modulator close to a heat-generating electronic component, it is expected that characteristic fluctuations and the degradation of reliability that cannot be predicted in the accelerated aging test or the like occurs particularly significantly.

CITATION LIST

Patent Literature

[Patent Literature No. 1] Japanese Laid-open Patent Publication No. 2016-99508
[Patent Literature No. 2] Japanese Laid-open Patent Publication No. 2015-102786

SUMMARY OF INVENTION

Technical Problem

From the above-described background, there is a desire for realizing an optical modulator capable of suppress characteristic fluctuations and the degradation of long-term reliability attributed to the disposition of a heat source such as an electronic component close to the optical modulator.

Solution to Problem

One aspect of the present invention is an optical modulator including an optical modulation element including optical waveguides formed on a substrate and a housing that accommodates the optical modulation element, the housing has a bottom surface wall having a quadrilateral shape in a plan view, a first long side wall and a second long side wall that are connected to two opposite edges of the bottom surface wall, and a first short side wall and a second short side wall that are shorter than the first long side wall and the second long side wall and are connected to two other opposite edges of the bottom surface wall, the optical modulation element is accommodated in a space surrounded by the bottom surface wall, the first long side wall and the second long side wall, and the first short side wall and the second short side wall, the second long side wall has a wall thickness that is equal to or larger than a wall thickness of the first long side wall, and at least one of the first and second short side walls has a wall thickness that is thinner than the wall thickness of the first long side wall.

According to another aspect of the present invention, the optical modulator further has
at least one protrusion portion provided on an inner surface of the first long side wall or the second long side wall, the at least one protrusion portion extending toward the optical modulation element.

According to another aspect of the present invention, a light input end and a light output end of the optical modulation element face the first short side wall and the second short side wall, respectively, and the second long side wall has a wall thickness that is thinner than the wall thickness of the first long side wall in a range including at least one of an optical input portion that is a range from an inner surface of the first short side wall to the light input end of the optical modulation element and an optical output portion that is a range from an inner surface of the second short side wall to the light output end of the optical modulation element.

According to another aspect of the present invention, a light input terminal portion that holds an input optical fiber that inputs light to the optical modulation element is fixed to the first short side wall, a light output terminal portion that holds an output optical fiber that guides light output from the optical modulation element to an outside of the housing is fixed to the second short side wall, and an optical component is attached to the light input terminal portion or the light output terminal portion, or an optical component is attached to the optical input portion or the optical output portion of the housing.

According to another aspect of the present invention, a recess portion is provided on an outer surface of the bottom surface wall within a predetermined distance range along a longitudinal direction from at least one of edges of the outer surface of the bottom surface wall that are connected to the first short side wall and the second short side wall.

According to another aspect of the present invention, the optical modulation element is an interference type optical modulation element that operates by interfering two lights with each other that propagate through two optical waveguides, respectively, each extending in a longitudinal direction of the optical modulation element.

According to another aspect of the present invention, the optical modulation element is an interference type optical modulation element that operates by interfering two lights with each other that propagate through two optical waveguides, respectively, each extending in a longitudinal direction of the optical modulation element, and the at least one protrusion portion extends toward the optical modulation element in a region on the first long side wall or the second long side wall, the region including a range where the two optical waveguides of the optical modulation element are formed.

According to another aspect of the invention, the wall thickness is defined as an average value of a thickness of a part or an entirety of each corresponding wall.

Another aspect of the present invention is an optical module including any one of the above-described optical modulators and electronic components that are heating elements.

According to another aspect of the invention, at least one of the electronic components is disposed in a side of the second side wall of the optical modulator.

According to another aspect of the invention, the optical modulator and the electronic components are mounted on a circuit board, and at least one of the electronic components is disposed in a side of the second side wall of the optical modulator and partly overlapping the optical modulator in a plan view.

It should be noted that the entire contents of Japanese Patent Application No. 2018-124468 filed on Jun. 29, 2018 is incorporated into this specification by reference.

Advantageous Effects of Invention

According to the present invention, in an optical modulator, even in a case where a heat source such as an electronic component is disposed close to the optical modulator, it is possible to suppress characteristic fluctuations or the degradation of long-term reliability attributed to the above-described disposition by suppressing the generation of an asymmetric temperature distribution in a modulator housing.

DESCRIPTION OF EMBODIMENTS

Hereinafter, embodiments of the present invention will be described with reference to drawings.

An optical modulator according to the present invention is intended to adjust the side wall thickness of a modulator housing such that the modulator housing is made to actively act as a heat sink or a favorable thermal conductor. In addition, at that time, unlike the related art, the thermal conduction to an optical modulation element is not avoided, and, on the basis of an idea totally opposite to the related art, the housing is configured to allow heat to be easily conducted to the entire optical modulation element, but an optical input and output port in which an optical component is mounted is configured to suppress thermal conduction. Therefore, an asymmetric temperature distribution in the optical modulation element is avoided, the thermal conduction to the optical component is avoided, and characteristic fluctuations and the degradation of long-term reliability in the optical modulator as a whole are avoided.

First Embodiment

Figure 1:
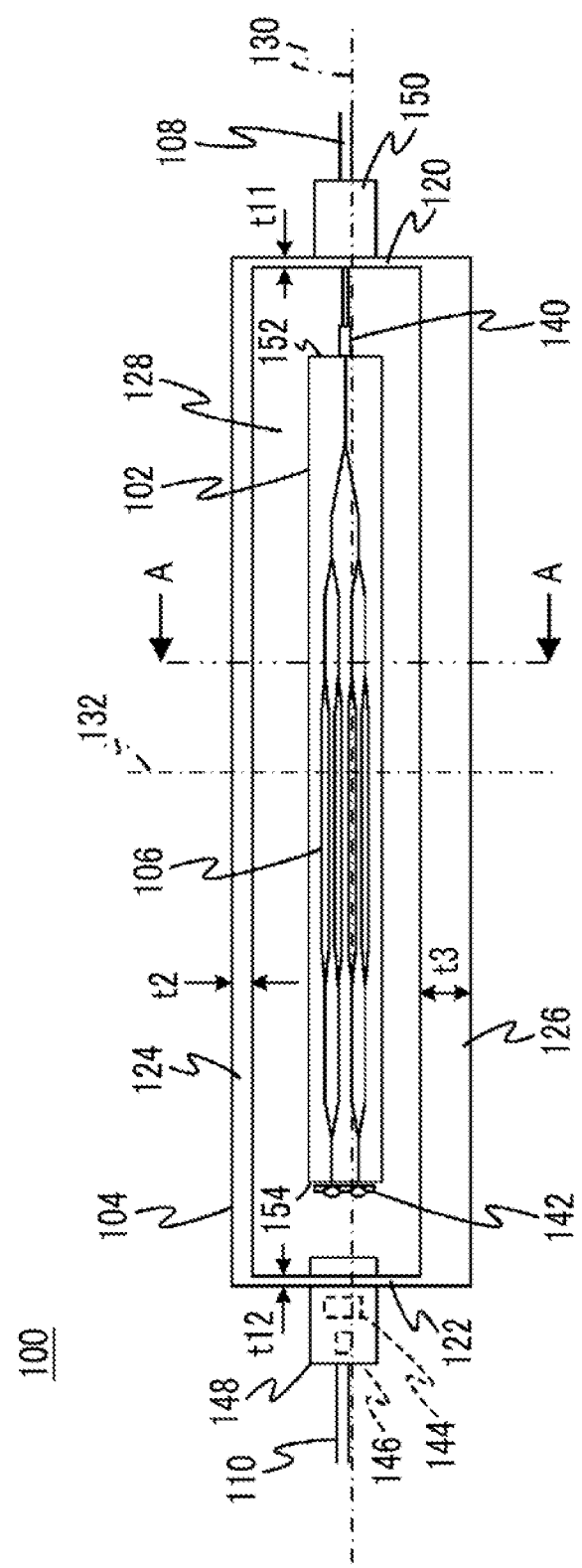
FIG. 1 is a plan view of an optical modulator according to a first embodiment of the present invention.
Figure 2:
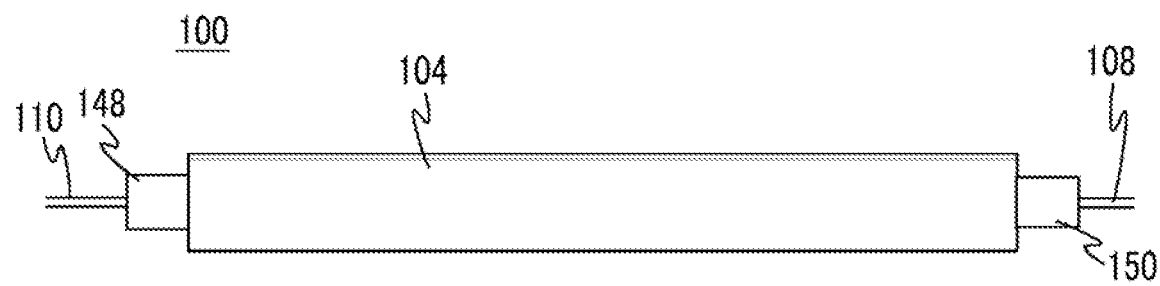
FIG. 2 is a side view of the optical modulator shown in FIG. 1.
Figure 3:
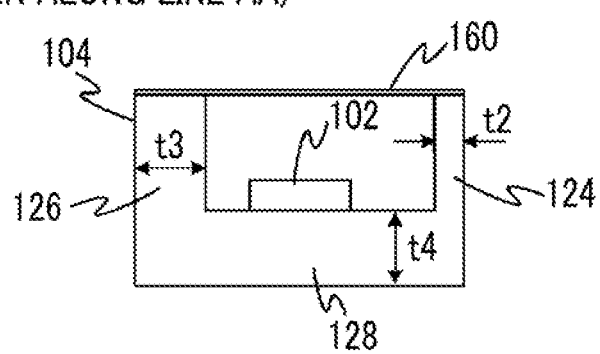
FIG. 3 is a cross-sectional view of the optical modulator shown in FIG. 1 taken along the line AA.

FIG. 1 is a plan view showing the configuration of an optical modulator 100 according to a first embodiment of the present invention, FIG. 2 is a side view of the optical modulator 100, and FIG. 3 is a cross-sectional view of the optical modulator 100 shown in FIG. 1 taken along the line AA.

The optical modulator 100 includes an optical modulation element 102, a modulator housing 104 that accommodates the optical modulation element 102, an input optical fiber 108 that inputs light to the optical modulation element 102, and an output optical fiber 110 that guides light output from the optical modulation element 102 to the outside of the modulator housing 104.

It should be noted that, since the modulator housing 104 is airtightly sealed, it is not possible to actually observe the inside of the modulator housing 104; however, in FIG. 1, configuration elements in the modulator housing 104 are indicated with solid lines in order to facilitate the understanding of the configuration in the modulator housing 104.

The modulator housing 104 is made of metal (for example, stainless steel, KOVAR, or the like) and has a rectangular shape or a quadrilateral shape (for example, an oblong shape or a substantially oblong shape) in a plan view. That is, the modulator housing 104 has a bottom surface wall 128 having a quadrilateral shape in a plan view, a long side wall 124 and a long side wall 126 that are connected to two opposite edges (the two (upper and lower) edges in the drawing of FIG. 1) of the bottom surface wall 128. In addition, the modulator housing 104 has a short side wall 120 and a short side wall 122 that are shorter than the long side walls 124 and 126 and are connected to two other opposite edges (the right and left edges in the drawing) of the bottom surface wall 128. In addition, the optical modulation element 102 is accommodated in a space surrounded by the bottom surface wall 128, the long side walls 124 and 126, and the short side walls 120 and 122. Here, in a plan view of the modulator housing 104, a line extending in the horizontal direction in the drawing along the center of the modulator housing 104 in the width direction is defined as a center line 130 with respect to the width direction, and a line extending in the vertical direction in the drawing along the center of the modulator housing with respect to the longitudinal direction is defined as a center line 132 with respect to the longitudinal direction.

The optical modulation element 102 is, for example, an interference type optical modulation element that causes light that propagates through, among optical waveguides 106, two optical waveguides extending in the longitudinal direction of the optical modulation element 102 to interfere with each other to perform an operation. Specifically, in the present embodiment, the optical modulation element 102 is a DP-QPSK optical modulator including four Mach-Zehnder type optical waveguides provided on a LiNbO$_3$ substrate and four RF electrodes (not shown) that are provided on the Mach-Zehnder type optical waveguides, respectively, and modulate light waves that propagate through the optical waveguides.

In FIG. 1, the end portion of the optical modulation element 102 on the right side in the drawing is a light input end 152 to which light is input, and the end portion on the left side in the drawing is a light output end 154 from which modulated light is output. In the optical modulation element 102, the light input end 152 and the light output end 154 are disposed to face the short side wall 120 and the short side wall 122, respectively. A light input terminal portion 150 that holds the input optical fiber 108 is fixed to the short side wall 120, and a light output terminal portion 148 that holds the output optical fiber 110 is fixed to the short side wall 122.

The end portion of the input optical fiber 108 introduced into the inside of the modulator housing 104 through the light input terminal portion 150 is inserted into a capillary 140, which is an optical component, and is fixed to the light input end 152 of the optical modulation element 102. The capillary 140 is made of, for example, glass. It should be noted that light may be input to the optical modulation element 102 with a space optical system instead of the input optical fiber 108.

Two light rays that are output from the optical modulation element 102 are collimated by two microlenses included in a microlens array 142, which is an optical component. The microlens array 142 is fixed to, for example, the light output end 154 of the optical modulation element 102. The two collimated light rays are polarized and combined by a polarization beam combining prism 144. The polarized and combined light is coupled to the output optical fiber 110 through a lens 146 and is output. Here, the polarization beam combining prism 144 and the lens 146, which are optical components, are provided in the light output terminal portion 148. After the output optical fiber 110 is fixed to the light output terminal portion 148, the light output terminal portion 148 is fixed to the short side wall 122 of the modulator housing 104.

As shown in FIG. 3, the optical modulation element 102 is fixed to the inner surface (upper surface in the drawing) of the bottom surface wall 128. FIG. 3 also shows a cover 160 having a thin plate thickness that configures a part of the modulator housing 104 in an opening portion in the upper portion in the drawing that are formed by the long side walls 124 and 126 of the modulator housing 104. In order to airtightly seal the inner space of the modulator housing 104 in which the optical modulation element 102 is accommodated, the cover 160 is, for example, seam-welded to four edges configured by the long side walls 124 and 126 and the short side walls 120 and 122 in FIG. 1.

It should be noted that, in the modulator housing 104, a plurality of lead pins for inputting high frequency signals for operating the optical modulation element 102, a relay board for guiding high frequency signals input from the plurality of lead pins to the RF electrodes in the optical modulation element 102, respectively, or the like may be provided (all are not shown). Therefore, on the inner surfaces of the short side walls 120 and 122 and the long side walls 124 and 126 of the modulator housing 104 and/or on the inner surface of the bottom surface wall 128, protrusions and recesses may be provided. However, in the present embodiment, the short side walls 120 and 122, the long side walls 124 and 126, and the bottom surface wall 128 of the modulator housing 104 are each described to have a uniform thickness in order to facilitate understanding by avoiding unnecessarily detailed description.

Particularly, in the optical modulator 100 of the present embodiment, the modulator housing 104 is configured such that a wall thickness t3 of the long side wall 126 on the lower side in the drawing and a wall thickness t2 of the long side wall 124 on the upper side in the drawing, which is opposite to the long side wall 126, satisfy t3≥t2 as shown in FIG. 1. In addition, the modulator housing 104 is configured such that a wall thickness t11 of the short side wall 120 and a wall thickness t12 of the short side wall 122 satisfy t11<t2 and t12<t2. Here, the long side wall 126 having the wall thickness t3 that is largest is disposed to face a side on which, for example, a DSP, which is a heat-generating electronic component, is mounted when the optical modulator 100 is mounted on, for example, a circuit board in optical modules.

It should be noted that, as described above, in the present embodiment, FIG. 1, FIG. 2, and FIG. 3 do not show any protrusion and recess for disposing the lead pins, the relay board, or the like, which are possibly provided in an actual modulator housing 104. Therefore, it is necessary to understand that the wall thickness of each of the short side walls 120 and 122, the long side walls 124 and 126, and the bottom surface wall 128 shown in FIG. 1 and FIG. 3 indicates the average value of the wall thickness in each wall in a case where a protrusion and a recess are provided. That is, in the present embodiment, the wall thickness t11 of the short side wall 120, the wall thickness t12 of the short side wall 122, the wall thickness t2 of the long side wall 124, and the wall thickness t3 of the long side wall 126 are defined as the average value of the wall thickness in each wall, and these average values have relationship of t11<t2≤t3 and t12<t2≤t3.

It should be noted that, in the present specification, the "average value" of the wall thickness refers to the average value of the thickness of parts of the corresponding wall or wall, and, even in a case where the wall or a part of the wall is connected to or intersects an adjacent wall, the average value refers to the average value of the thickness of the so-called "wall" itself or the part of the "wall" itself, not including the connecting or intersecting part. For example, in a case where the inner surface of the corresponding wall or a part of the wall (the inside surface of the modulator housing) is connected to the inner surface of an adjacent wall through a curved portion (R-processed portion), the average value refers to the average value of the thickness of the "wall" itself or the part of the "wall" itself, excluding the curved portion.

Here, the wall thickness t3 of the long side wall 126 is larger than a value of approximately 1.5 mm, which is the wall thickness t2 that is typically used in conventional optical modulators, to realize a lower thermal resistance than the thermal resistance of long side walls in conventional optical modulators and is desirably set in, for example, a range of values of 2.0 mm or more and 3.0 mm or less. In addition, when the mechanical strength of the modulator housing 104 is also taken into account, the wall thicknesses t11 and t12 are desirably set in, for example, a range of values of 0.5 mm or more and 1.0 mm or less such that the thermal resistance of the short side wall 120 and the short side wall 122 becomes a large value compared with the thermal resistance of the long side walls 124 and 126.

For example, in the case of a configuration where the long side wall 126 has a protrusion and a recess, it is possible to form the long side wall 126 in a thickness range of 1.7 mm to 4 mm and to set the wall thickness t3, which is the average wall thickness, in a range of values of 2.0 mm or more and 3.0 mm or less. In addition, for example, in the case of a configuration where the short side wall 120 and the short side wall 122 have a protrusion and a recess, it is possible to form the short side wall 120 and the short side wall 122 in a thickness range of 0.3 mm to 1 mm, respectively, and to set the wall thicknesses t11 and t12, which are the average wall thicknesses, in a range of values of 0.5 mm or more and 1.0 mm or less, respectively.

Figure 15:
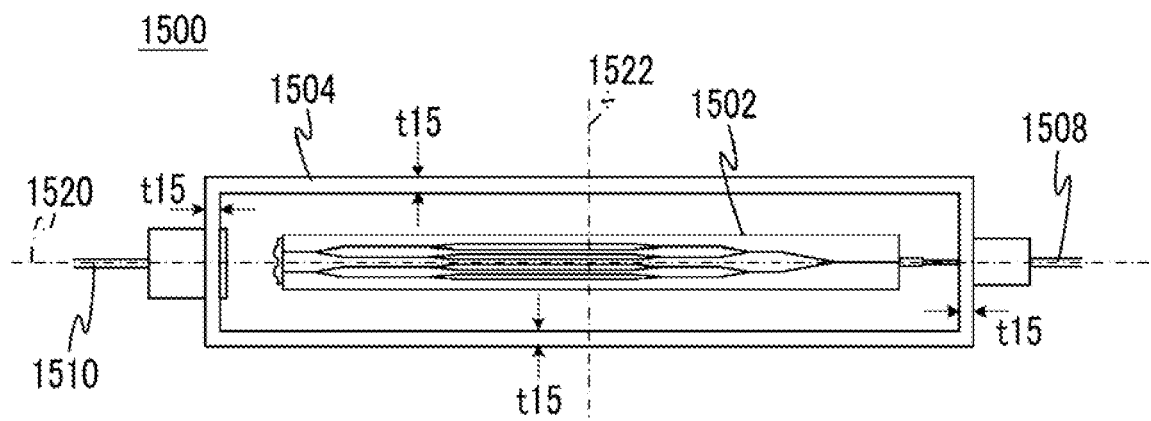
FIG. 15 is a plan view showing the configuration of a conventional optical modulator.
Figure 16:
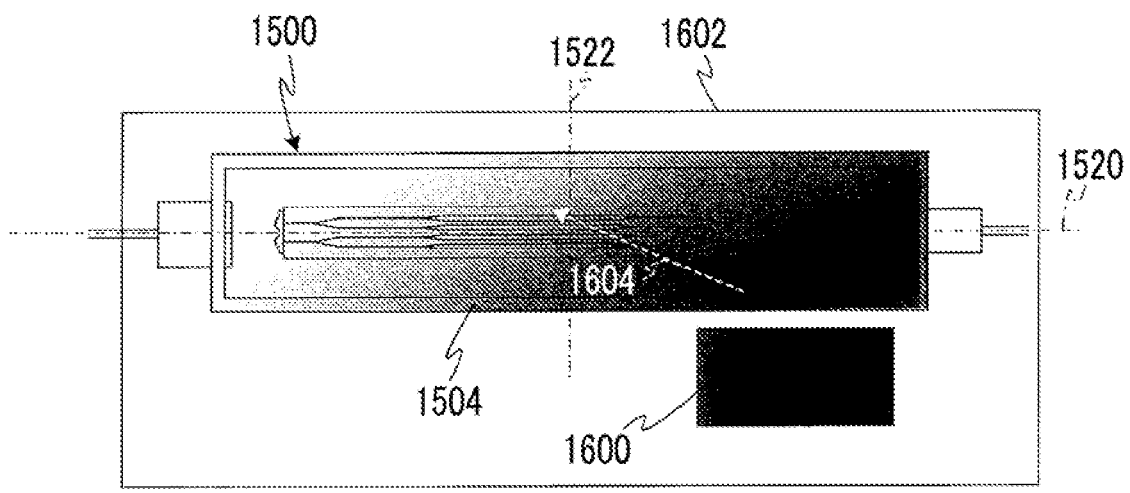
FIG. 16 is a view showing an example of a temperature distribution generated in a modulator housing in a case where the conventional optical modulator is mounted on a circuit board.

In the optical modulator 100 having the above-described configuration, the thermal resistance of the long side wall 126 along the long side of the modulator housing 104 is reduced by making the wall thickness t3 of the long side wall 126 thickest. Therefore, for example, in a case where the optical modulator 100 is mounted on a circuit board in an optical module, heat that flows from a DSP or the like, which is a heat-generating electronic component, into a part of the modulator housing 104 through the circuit board or a space propagates along the long side wall 126 having the largest wall thickness faster than in conventional configurations. In addition, the propagating heat immediately flows out onto the circuit board. As a result, the temperature gradient in the longitudinal direction of the modulator housing 104 is reduced compared with those in conventional optical modulators (for example, the optical modulator 1500 shown in FIG. 15). In addition, when the temperature gradient in the longitudinal direction of the modulator housing 104 is reduced, the direction of the temperature gradient in the modulator housing 104 as a whole becomes a direction close to the longitudinal direction compared with the direction 1604 shown in FIG. 16.

That is, in the optical modulator 100, it is possible to generate a temperature gradient that is milder than conventional temperature gradients in the modulator housing 104 along the longitudinal direction of the modulator housing 104 even in a case where a heat-generating electronic component such as a DSP is disposed close to the optical modulator 100. Therefore, the symmetry of the temperature distribution with respect to the center line 132 with respect to the longitudinal direction and the center line 130 with respect to the width direction of the modulator housing 104 improves.

As a result, in a case where the optical modulator 100 is disposed close to a heat-generating electronic component, stress generated in the modulator housing 104 is reduced and dispersed. In addition, the symmetry of the temperature distribution in the modulator housing 104 improves, whereby the temperature distribution in the optical modulation element 102, which is an interference type optical modulator accommodated in the modulator housing 104, also becomes more symmetric. As a result, the optical path length change or phase change between parallel waveguides that configure the optical modulation element 102 is significantly offset, and the characteristic fluctuations (for example, an operating point fluctuation) of the optical modulation element 102 is also suppressed.

Furthermore, in the modulator housing 104, the wall thickness t3 of the long side wall 126 is formed thickest, whereby the thermal resistance of the long side wall 126 along the long edge of the modulator housing 104 is reduced, and the stiffness of the modulator housing 104 can be secured mainly by the long side walls 124 and 126 and the bottom surface wall 128. Therefore, it is possible to increase the thermal resistance of these walls by thinning the wall thicknesses t11 and t12 of the short side walls 120 and 122 compared with those in optical modulators in the related art. Therefore, it is possible to suppress the inflow of heat into the short side walls 120 and 122 to which an optical fiber, an optical component, or the like is fixed and the vicinities of the short side walls 120 and 122, which can be a cause for characteristic fluctuations and the degradation of long-term reliability attributed to an increase in temperature, by satisfying t11<t2≤t3 and t12<t2≤t3 as described above without impairing the stiffness of the modulator housing 104.

As a result of what has been described above, in the optical modulator 100, it is possible to reduce characteristic fluctuations and the degradation of long-term reliability by forming the temperature distribution in the modulator housing 104 in a more symmetric state even in a case where a heat-generating electronic component such as a DSP is disposed close to the optical modulator 100 in optical modules. In addition, as a result of the more symmetric temperature distribution state of the modulator housing 104, the modulator housing 104 in an optical module is more likely to be in a state of being placed in a uniform temperature environment as in a long-term reliability test in a constant-temperature bath. Therefore, the long-term reliability of the modulator housing 104 becomes close to the result of a long-term reliability test in a constant-temperature bath and thus can be further enhanced compared with those of conventional configurations.

It should be noted that, relative to the conventional average wall thickness of 1.5 mm, when the wall thickness t3 of the long side wall 126 is set in a range of values of 2.0 mm or more and 3.0 mm or less, and the wall thickness t11 of the short side wall 120 and the wall thickness t12 of the short side wall 122 are set in a range of values of 0.5 mm or more and 1.0 mm or less as described above, the above-described effect of improving the symmetry of the temperature gradient becomes particularly significant.

In addition, in the above-described embodiment, the relationship of the wall thickness t2 of the long side wall 124, the wall thickness t3 of the long side wall 126, and a wall thickness t4 of the bottom surface wall 128 (specifically, the average value t4 of the wall thickness of the bottom surface wall 128) in the modulator housing 104 shown in FIG. 3 desirably satisfies, for example, t3>t4>t2 in consideration of the transfer of heat in the short edge direction being slower than in the long edge direction and the symmetry of the temperature distribution with respect to the center line 132 with respect to the longitudinal direction and the center line 130 with respect to the width direction in a case where the wall thicknesses are all the same.

In addition, the wall thickness t11 of the short side wall 120 and the wall thickness t12 of the short side wall 122 may be the same value or may be different values. In addition, both the wall thickness t11 of the short side wall 120 and the wall thickness t12 of the short side wall 122 do not necessarily need to be smaller values than the wall thickness t2 of the long side wall 124. For example, depending on the magnitude (sensitivity) of the influence of the temperature fluctuations of the short side walls 120 and 122 on the positional deviation and characteristic fluctuations of the input optical fiber 108, the output optical fiber 110, the microlens array 142, the polarization beam combining prism 144, or the lens 146, it is possible to set at least one of t11 or t12 to a value smaller than the wall thickness t2.

Second Embodiment

Figure 4:
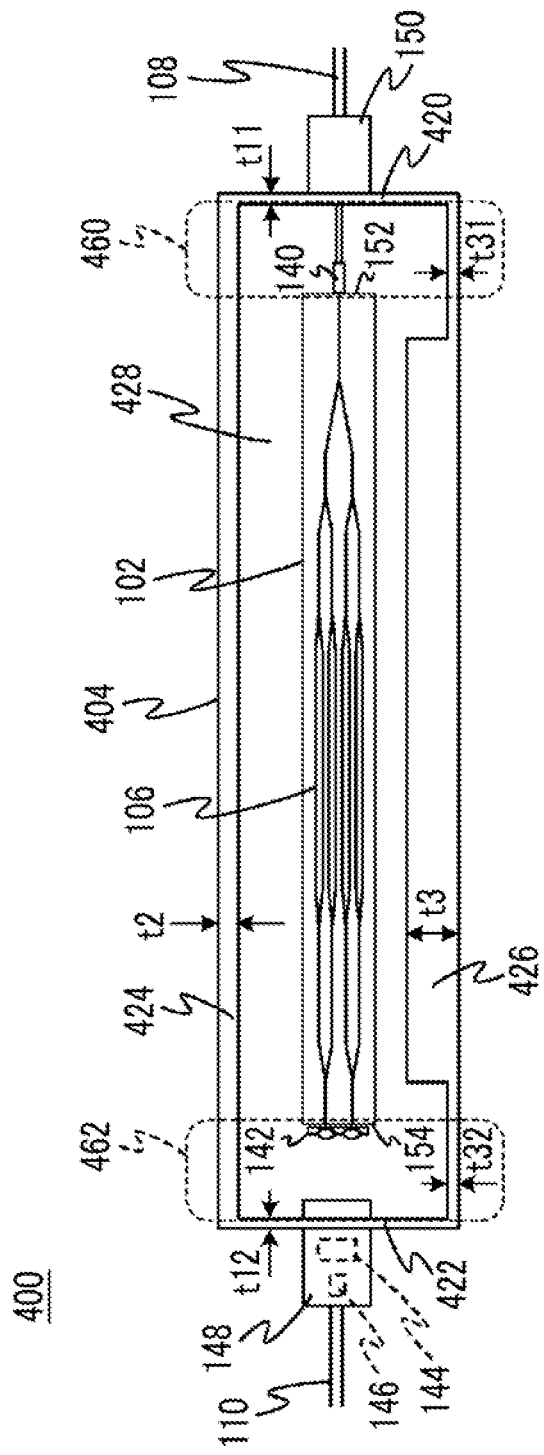
FIG. 4 is a plan view of an optical modulator according to a second embodiment of the present invention.

Next, a second embodiment of the present invention will be described. FIG. 4 is a plan view showing the configuration of an optical modulator 400 according to the second embodiment. In FIG. 4, for the same configuration element and wall thickness as in the optical modulator 100 according to the first embodiment in FIG. 1, the same reference sign as in FIG. 1 is used, and the description of the above-described optical modulator 100 will be incorporated. In addition, the side surfaces and cross section of the optical modulator 400 are regarded as the same as the side surfaces and cross section of the optical modulator 100 shown in FIG. 2 and FIG. 3. In addition, in FIG. 4, in order to facilitate the understanding of the configuration of the optical modulator 400, similar to FIG. 1, the internal structure, which cannot be observed in a state where the optical modulator 400 is completely assembled, is also indicated with solid lines.

The optical modulator 400 has the same configuration as the optical modulator 100, but is different in terms of the fact that a modulator housing 404 is provided instead of the modulator housing 104. The modulator housing 404 has short side walls 420 and 422, long side walls 424 and 426, and a bottom surface wall 428 that are similar to the short side walls 120 and 122, the long side walls 124 and 126, and the bottom surface wall 128 of the modulator housing 104, respectively, but is different from the modulator housing 104 in terms of the fact that the modulator housing 404 has portions thinner than the wall thickness t3 in the right and left portions of the long side wall 426 in the drawing.

Specifically, portions having thin wall thicknesses t31 and t32 that are the same as the wall thicknesses t11 and t12 are provided at, in the long side wall 426, an optical input portion 460 that is a range from the inner surface of the short side wall 420 to the light input end 152 of the optical modulation element 102 and an optical output portion 462 that is a range from the inner surface of the short side wall 422 to the light output end 154 of the optical modulation element 102, respectively. The wall thicknesses t31 and t32 are desirably, for example, 1 mm or less similar to the wall thicknesses t11 and t12 of the short side walls 420 and 422. In addition, the wall thicknesses t31 and t32 can be set to the same values as, for example, the wall thicknesses t11 and t12 of the short side walls 420 and 422, respectively, or the wall thicknesses t31, t32, t11 and t12 can be all set to the same wall thickness.

It should be noted that the modulator housing 404 shown in FIG. 4, similar to the modulator housing 104 shown in FIG. 1, does not show any protrusion and recess for disposing the lead pins, the relay board, or the like, which are possibly provided in an actual modulator housing 404. That is, it is necessary to understand that the wall thickness of each of the short side walls 420 and 422 and the long side walls 424 and 426 shown in FIG. 4 indicates the average wall thickness in each wall. That is, in the present embodiment, the wall thickness t11 of the short side wall 420, the wall thickness t12 of the short side wall 422, and the wall thickness t2 of the long side wall 424 mean the average value of the wall thickness in each wall. In addition, the wall thicknesses t31 and t32 of the long side wall 426 indicate the average values of the wall thicknesses of the long side wall 426 in the optical input portion 460 and in the optical output portion 462, respectively, and the wall thickness t3 indicates the average value of the wall thickness of the long side wall 426 in the portion other than the optical input portion 460 and the optical output portion 462.

The optical modulator 400 having the above-described configuration is configured such that the wall thicknesses t31 and t32 of the long side walls 226 in the optical input portion 460 and in the optical output portion 462 are thinner than the wall thickness t2 and the thermal resistance of the long side walls 226 increases in these portions. Therefore, in the optical modulator 400, in the portion of the modulator housing 404 along the longitudinal direction of the optical modulation element 102, it is possible to suppress the inflow of heat into the optical input portion 460 and the optical output portion 462 that significantly affect characteristics and long-term reliability while mitigating the temperature gradient by reducing thermal resistance as in the optical modulator 100. Therefore, in the optical modulator 400, it is possible to further suppress characteristic fluctuations and the degradation of long-term reliability in a case where a heat-generating electronic component is disposed close to the optical modulator 400 by further suppressing the temperature gradients in the optical input portion 460 and the optical output portion 462 compared with the optical modulator 100. This configuration is particularly advantageous in a case where an optical component such as the capillary 140 or the microlens array 142 is directly joined to the light input end 152 or the light output end 154 of the optical modulation element 102 with an adhesive or the like.

It should be noted that, in the present embodiment, the capillary 140 and the microlens array 142, which are optical components, are disposed in the optical input portion 460 and the optical output portion 462, respectively, and the polarization beam combining prism 144 and the lens 146, which are optical components, are disposed in the light output terminal portion 148, but the configuration is not limited to this configuration. An optical component may be attached to the light input terminal portion 150 or the light output terminal portion 148 or an optical component may be attached to the optical input portion 460 or the optical output portion 462. Even in such a case, according to the configuration of the modulator housing 404, it is possible to further suppress characteristic fluctuations and the degradation of long-term reliability by suppressing the flow of heat toward these optical components. In addition, the optical component may be attached to the inner surface of the bottom surface wall 128.

Third Embodiment

Figure 5:
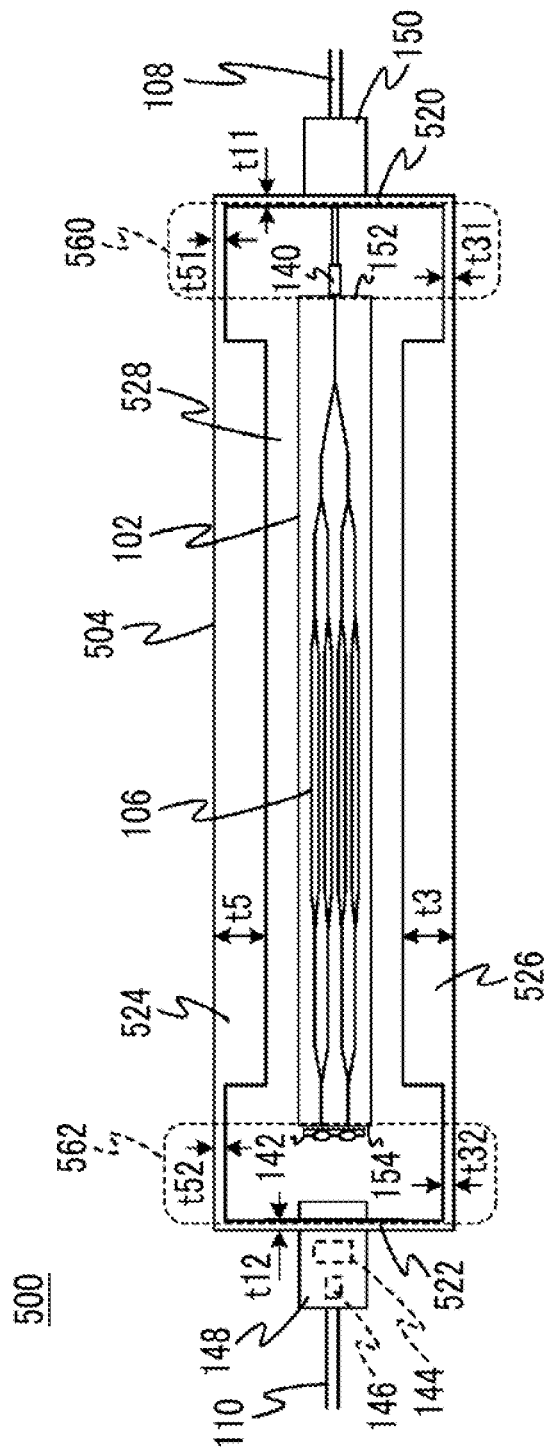
FIG. 5 is a plan view of an optical modulator according to a third embodiment of the present invention.

Next, a third embodiment of the present invention will be described. FIG. 5 is a plan view showing the configuration of an optical modulator 500 according to the third embodiment. In FIG. 5, for the same configuration element and wall thickness as in the optical modulator 100 according to the first embodiment in FIG. 1 and in the optical modulator 400 according to the second embodiment in FIG. 4, the same reference sign as in FIG. 1 and FIG. 4 is used, and the description of the above-described optical modulators 100 and 400 will be incorporated. In addition, the side surfaces and cross section of the optical modulator 500 are regarded as the same as the side surfaces and cross section of the optical modulator 100 shown in FIG. 2 and FIG. 3. In addition, in FIG. 5, in order to facilitate the understanding of the configuration of the optical modulator 500, similar to FIG. 1, the internal structure, which cannot be observed in a state where the optical modulator 500 is completely assembled, is also indicated with solid lines.

The optical modulator 500 has the same configuration as the optical modulator 100, but is different in terms of the fact that a modulator housing 504 is provided instead of the modulator housing 104. The modulator housing 504 is, similar to the modulator housing 104, made of metal (for example, stainless steel, KOVAR, or the like) and has an oblong shape or a substantially oblong shape in a plan view. In addition, the modulator housing 504, similar to the modulator housing 104, has a bottom surface wall 528 having a quadrilateral shape in a plan view, a long side wall 524 and a long side wall 526 that are connected to two opposite edges (the two (upper and lower) edges in the drawing of FIG. 5) of the bottom surface wall 528. In addition, the modulator housing 504 has a short side wall 520 and a short side wall 522 that are shorter than the long side walls 524 and 526 and are connected to two other opposite edges (the right and left edges in the drawing) of the bottom surface wall 528.

In addition, in the optical modulator 500 of the present embodiment, the short side walls 520 and 522 of the modulator housing 504 have the same wall thicknesses t11 and t12 as the short side walls 120 and 122 of the modulator housing 104, respectively.

In addition, in the optical modulator 500, the long side wall 526 has the wall thickness t3 in a portion other than an optical input portion 560 and an optical output portion 562, similar to the long side wall 426 of the modulator housing 404 in the second embodiment, and has the wall thicknesses t31 and t32 in the portions of the optical input portion 560 and the optical output portion 562, respectively. Here, the optical input portion 560 and the optical output portion 562 refer to, similar to the optical input portion 460 and the optical output portion 462 in the second embodiment, a portion from the inner surface of the short side wall 520 to the light input end 152 of the optical modulation element 102 and a portion from the inner surface of the short side wall 522 to the light output end 154 of the optical modulation element 102, respectively.

Particularly, in the optical modulator 500, compared with the optical modulator 400, furthermore, the long side wall 524 of the modulator housing 504 also has a wall thickness t5 that is substantially the same as the wall thickness t3 in the portion other than the optical input portion 560 and the optical output portion 562 and has wall thicknesses t51 and t52 that are substantially the same as the wall thicknesses t31 and t32 in the optical input portion 560 and the optical output portion 562, respectively. That is, the wall thickness t5 is desirably set, similar to the wall thickness t3, in a range of values of 2.0 mm or more and 3.0 mm or less, and the wall thicknesses t51 and t52 are desirably set, similar to the wall thicknesses t31 and t32, in a range of values of 0.5 mm or more and 1.0 mm or less. For example, the wall thickness t5 can be set to the same value as the wall thickness t3, and the wall thicknesses t51 and t52 can be set to the same values as the wall thicknesses t31 and t32 or the same values as the wall thicknesses t11 and t12, respectively. Alternatively, the wall thicknesses 11, t12, t31, t32, t51, and t52 can be set to the same value.

In the optical modulator 500 having the above-described configuration, since the wall thickness t5 of the long side wall 524 is configured to be substantially the same as the wall thickness t3 of the long side wall 526, compared with the optical modulators 100 and 400, it is possible to further suppress characteristic fluctuations and the degradation of long-term reliability by reducing the temperature gradient in the modulator housing 504 and improving the symmetry of the temperature distribution even in a case where the optical modulator 500 is disposed close to a heat-generating electronic component such as a DSP.

In addition, in the optical modulator 500, the wall thicknesses t51, t52, t31, and t32 in the optical input portion 560 and the optical output portion 562 are formed thinner than the wall thicknesses t3 and t5 in both the long side walls 524 and 526, and the optical input portion 560 and the optical output portion 562 are configured to have high thermal resistance. In the optical modulator 500, compared with the optical modulators 100 and 400, it is possible to further suppress characteristic fluctuations and the degradation of long-term reliability by suppressing the transfer of heat to the optical output portion 562 and the optical input portion 560 that may include an optical component or the like that is sensitive to temperature fluctuations.

The configuration of the optical modulator 500 is preferable in a case where it is desired to further enhance the stiffness of the modulator housing in order to further suppress the positional deviation of optical systems, a case where it is desired to further decrease the temperature gradient in the optical input portion 560 and/or in the optical output portion 562, a case where it is desired to enhance the stress balance in the entire modulator housing, a case where the amount of heat generated from an electronic component is large, or the like.

Fourth Embodiment

Figure 6:
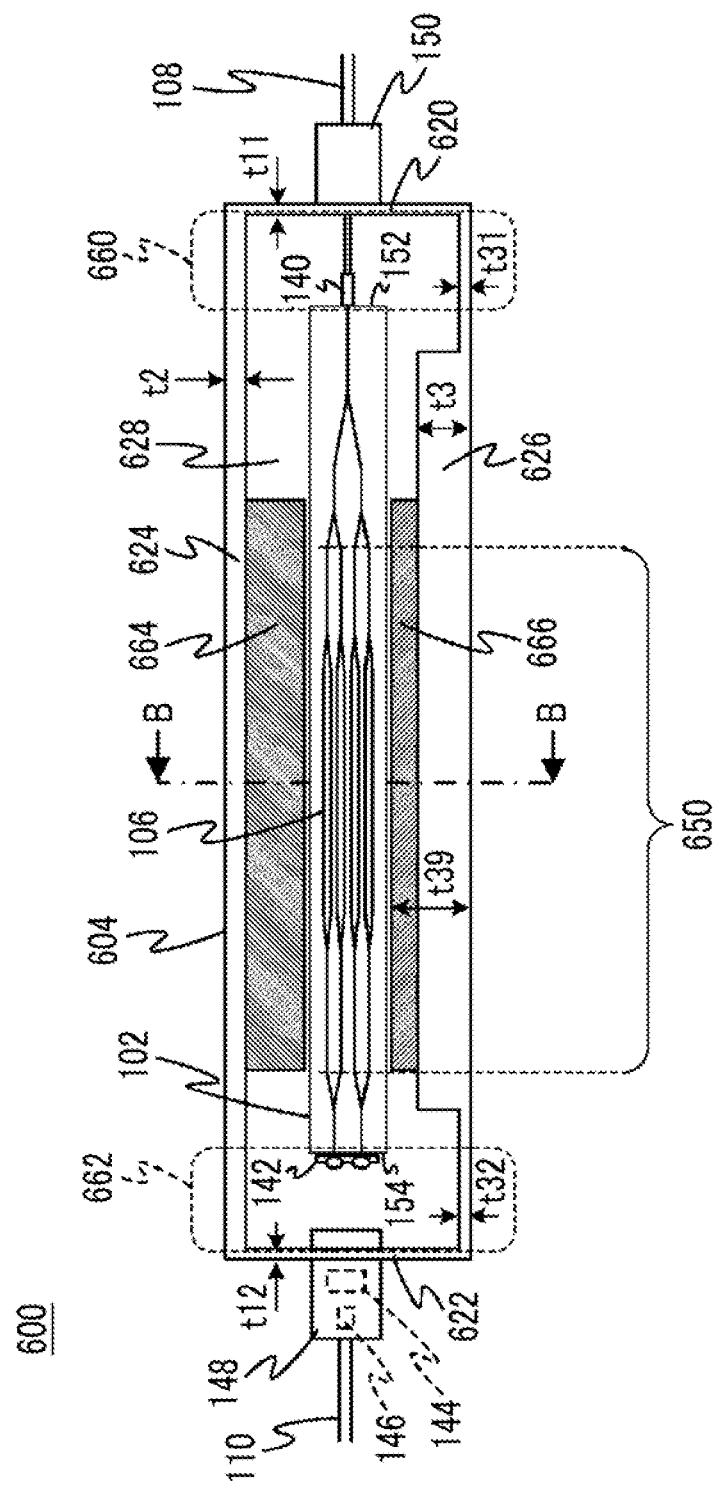
FIG. 6 is a plan view of an optical modulator according to a fourth embodiment of the present invention.
Figure 7:
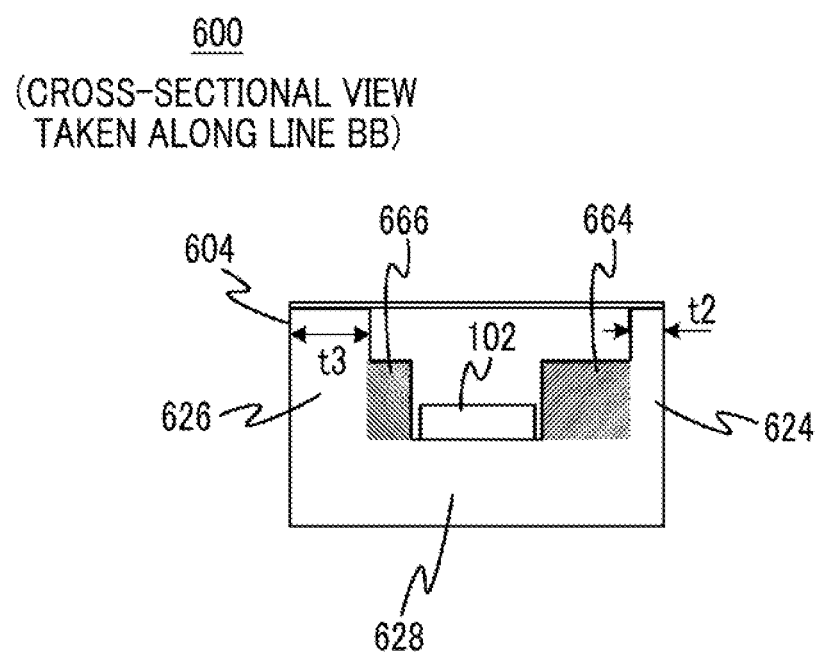
FIG. 7 is a cross-sectional view of the optical modulator shown in FIG. 6 taken along the line BB.

Next, a fourth embodiment of the present invention will be described. FIG. 6 is a plan view showing the configuration of an optical modulator 600 according to the fourth embodiment, and FIG. 7 is a cross-sectional view of the optical modulator 600 shown in FIG. 6 taken along the line BB. It should be noted that, in FIG. 6, for the same configuration element and wall thickness as in the optical modulator 400 according to the second embodiment in FIG. 4 and in the optical modulator 100 according to the first embodiment in FIG. 1, the same reference sign as in FIG. 4 and FIG. 1 is used, and the description of the above-described optical modulators 400 and 100 will be incorporated. In addition, the side surfaces of the optical modulator 600 are regarded as the same as the side surfaces of the optical modulator 100 shown in FIG. 2 as in the optical modulator 400. In addition, in FIG. 6, in order to facilitate the understanding of the configuration of the optical modulator 600, similar to FIG. 1 and FIG. 4, the internal structure, which cannot be observed in a state where the optical modulator 600 is completely assembled, is also indicated with solid lines.

The optical modulator 600 has the same configuration as the optical modulator 400, but is different in terms of the fact that a modulator housing 604 is provided instead of the modulator housing 404. The modulator housing 604 has short side walls 620 and 622, long side walls 624 and 626, and a bottom surface wall 628 that are similar to the short side walls 420 and 422, the long side walls 424 and 426, and the bottom surface wall 428 of the modulator housing 404, respectively. However, in the long side walls 624 and 626, protrusion portions 664 and 666 (the hatched portions in the drawing) that protrude toward the optical modulation element 102 are formed in ranges including at least a part of an interference portion 650 of the optical modulation element 102, respectively. Here, the interference portion 650 refers to a portion made up of at least one pair of (two) parallel waveguides through which two light rays, which are caused to interfere with each other in a modulation operation, propagate in the optical modulation element 102, specifically, a portion where parallel waveguides that configure the optical waveguides 106, which are Mach-Zehnder type optical waveguides, are formed.

It should be noted that, in the modulator housing 604 shown in FIG. 6 as well, similar to FIG. 1 and FIG. 4, it is necessary to understand that the wall thickness of each of the short side walls 620 and 622 and the long side walls 624 and 626 indicates the average wall thickness in each wall. That is, in the present embodiment, the wall thickness t11 of the short side wall 620 and the wall thickness t12 of the short side wall 622 mean the average value of the wall thickness in each wall. In addition, the wall thickness t2 of the long side wall 624 means the average value of the wall thickness of the long side wall 624 in the portion excluding the protruding portion 664. In addition, the wall thicknesses t31 and t32 of the long side wall 626 indicate the average values of the wall thicknesses of the long side wall 626 in an optical input portion 660 and an optical output portion 662, respectively, and the wall thickness t3 indicates the average value of the wall thickness of the long side wall 626 in the portion other than the optical input portion 660 and the optical output portion 662, excluding the protrusion portion 666. Here, the optical input portion 660 and the optical output portion 662 refer to, similar to the optical input portion 460 and the optical output portion 462 in the optical modulator 400 shown in FIG. 4, a range from the inner surface of the short side wall 620 to the light input end 152 of the optical modulation element 102 and a range from the inner surface of the short side wall 622 to the light output end 154 of the optical modulation element 102, respectively.

It should be noted that, in the optical modulator 600, since the protrusion portion 666 is provided, the wall thickness t12 of the short side wall 622 does not necessarily need to be thinner than t3 and may be thinner than an average value t39 of the wall thickness of the long side wall 626 in the portion including the protrusion portion 666. Therefore, the thermal resistance of the short side wall 622 becomes higher than the thermal resistance of the long side wall 626 in the portion including the protrusion portion 666, and the transfer of heat from the portion of the long side wall 626 is suppressed.

The optical modulator 600 having the above-described configuration has, in the long side walls 624 and 626, the protrusion portions 664 and 666 that protrude toward the optical modulation element 102, respectively, in the ranges including the interference portion 650 of the optical modulation element 102. Therefore, in the optical modulator 600, the wall thicknesses of the long side walls 624 and 626 in the portions extending along the interference portion 650 of the optical modulation element 102 in the modulator housing 604 effectively increase, and the thermal resistance is further reduced. As a result, in the optical modulator 600, compared with the optical modulator 400, it is possible to reduce a temperature gradient that is generated in the modulator housing 604 in a case where a heat-generating electronic component is disposed close to the optical modulator 600 and to improve the symmetry of the temperature distribution. Therefore, it is possible to further suppress characteristic fluctuations and the degradation of reliability.

It should be noted that, in the present embodiment, the protrusion portions 664 and 666 are provided in two long side walls 624 and 626, respectively, but the protrusion portion may be provided in any one of the long side walls. In addition, in the present embodiment, the long side walls 624 and 626 are each provided with one of the protrusion portions 664 and 666, but the configuration is not limited to this configuration. In at least one of the long side walls 624 or 626, one or a plurality of (therefore, at least one) protrusion portions may be provided toward the optical modulation element 102 in the range including the interference portion 650 of the optical modulation element 102.

In addition, in the present embodiment, the protrusion portions 664 and 666 have a substantially rectangular shape in a plan view as shown in FIG. 6, but the shapes of the protrusion portions 664 and 666 are not limited to the above-described shape. For example, the protrusion portion may be given an arbitrary shape such as a trapezoidal shape in a plan view, a shape in which large and small rectangles or trapezoids are overlapped, or a shape in which a recess portion is provided toward the optical modulation element 102.

Figure 8:
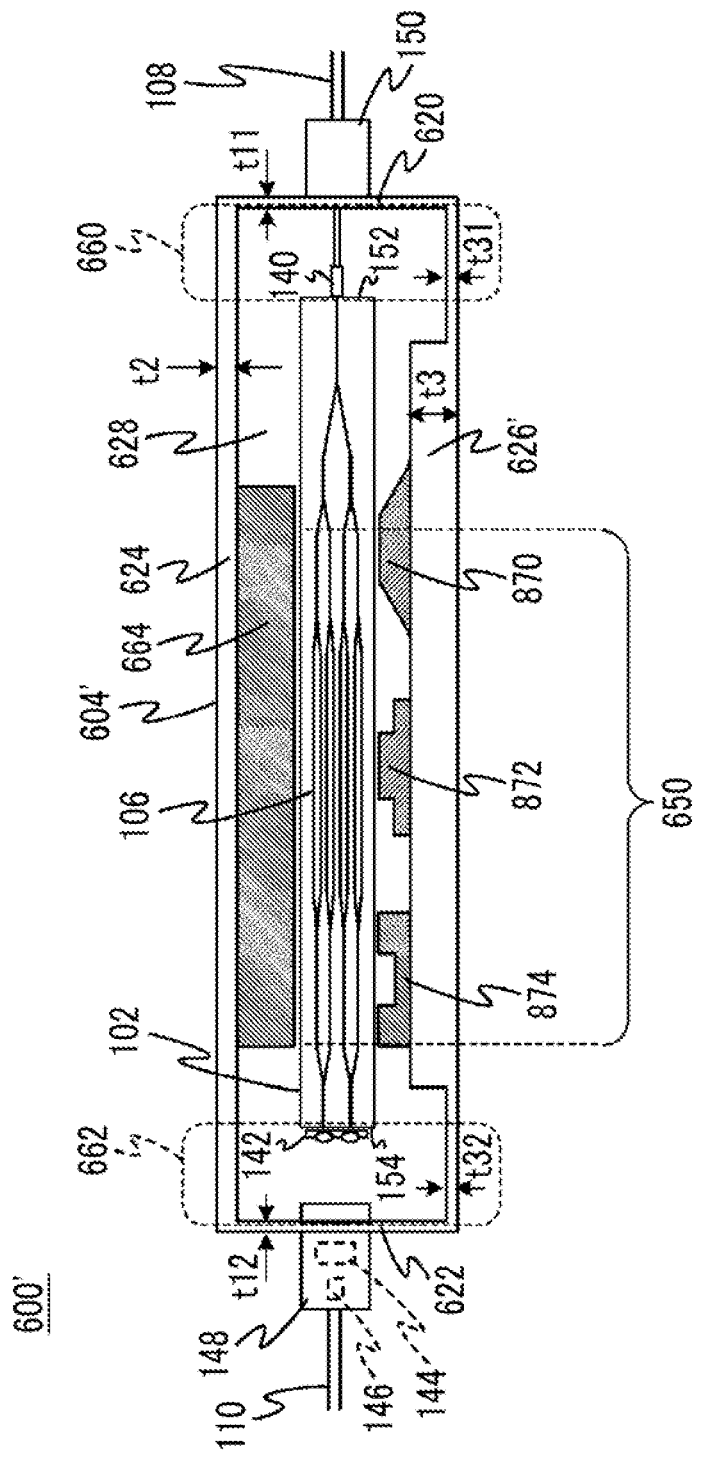
FIG. 8 is a plan view showing a modification example of an optical modulator according to a fourth embodiment of the present invention.

FIG. 8 is a plan view showing the configuration of an optical modulator 600' that is a modification example of the optical modulator 600. A modulator housing 604' of the optical modulator 600' has the same configuration as the modulator housing 604, but is different in terms of the fact that a long side wall 626' is provided instead of the long side wall 626 that is provided with one protrusion portion 666 having a substantially rectangular shape in a plan view. The long side wall 626' has the same configuration as the long side wall 626, but is different in terms of the fact that three protrusion portions 870, 872, and 874 that protrude toward the optical modulation element 102 are provided in the range including the interference portion 650 of the optical modulation element 102.

In the present modification example, the protrusion portions 870, 872, and 874 each have a different shape. Specifically, the protrusion portion 870 has one trapezoidal shape in a plan view and has two edges (the right and left edges in the drawing) that are processed to linearly come close to each other from the inner wall of the long side wall 626' toward the optical modulation element 102. In addition, the protrusion portion 872 is processed to have a planar shape in which two large and small rectangles (or substantial rectangles) are overlapped. In addition, the protrusion portion 874 has a substantially rectangular shape in a plan view that has a recess portion toward the optical modulation element 102. It should be noted that the rectangle mentioned herein includes a rectangle having a curved line in a part of the edges that form the rectangle. The edges that form the rectangle more preferably have a curved line in at least a part of the edges rather than are all linear because it is possible to mitigate the partial concentration of stress in the housing.

It should be noted that, in the present modification example, the three protrusion portions 870, 872, and 874 having mutually different planar shapes are provided in the long side wall 626', but the configuration is not limited to this configuration. In the long side wall 626', one protrusion portion having any one of the planar shapes of the protrusion portions 870, 872, and 874 may be provided. Alternatively, the number of protrusion portions that are provided in the long side wall 626' can be set to four or more. In addition, the planar shapes of the respective protrusion portions may be the same as each other or may be different from each other. In addition, the long side wall 624 can also be provided with a plurality of protrusion portions having the same arbitrary shape or different arbitrary shapes instead of the protrusion portion 664.

Fifth Embodiment

Figure 9:
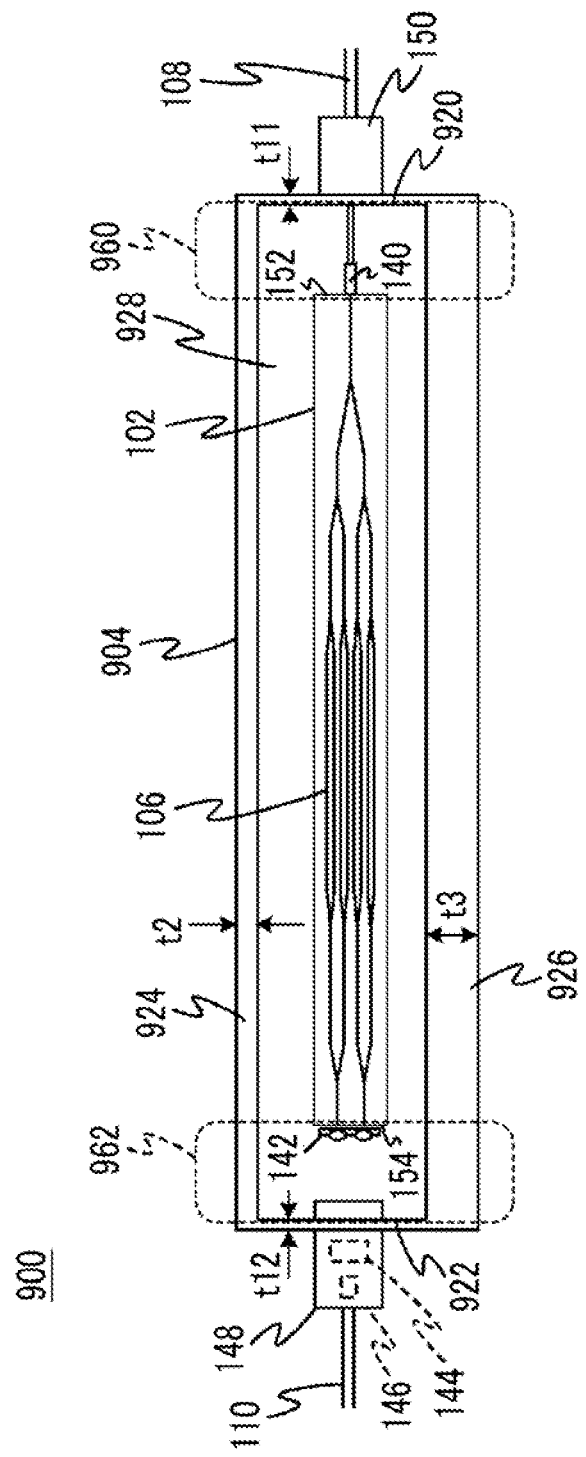
FIG. 9 is a plan view of an optical modulator according to a fifth embodiment of the present invention.
Figure 10:
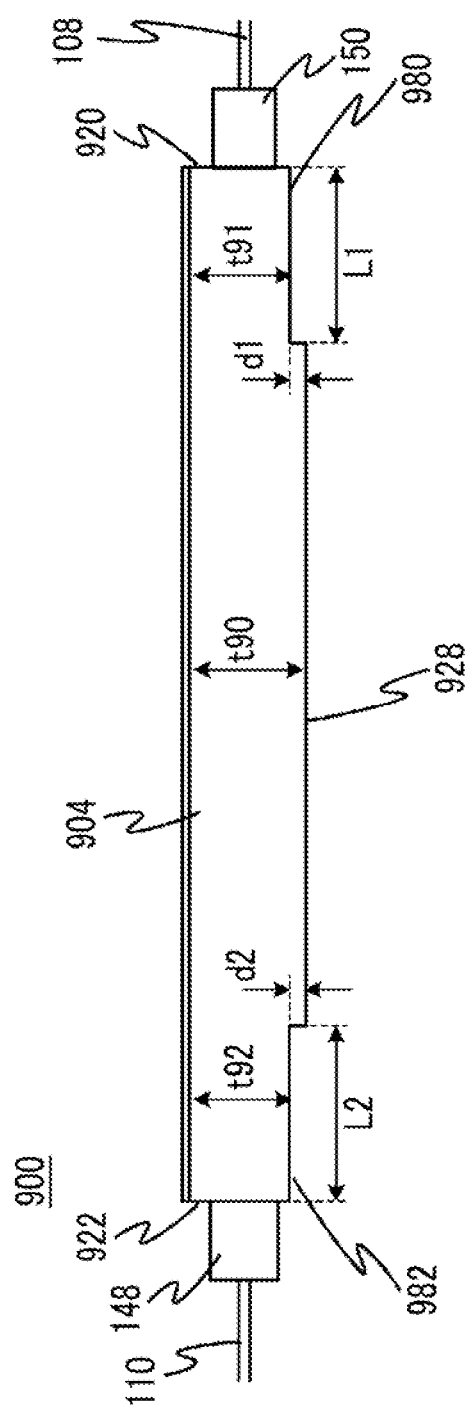
FIG. 10 is a side view of the optical modulator shown in FIG. 9.
Figure 11:
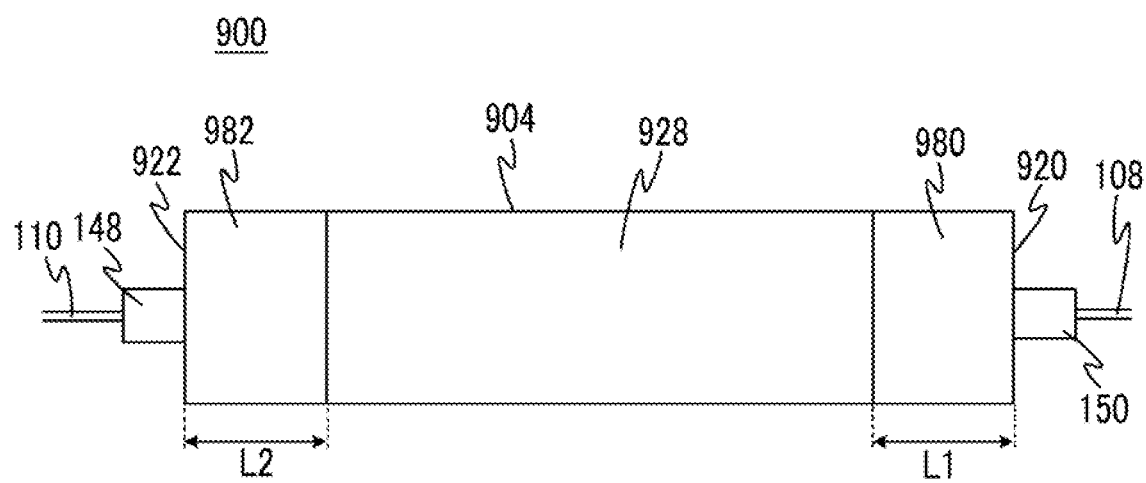
FIG. 11 is a bottom view of the optical modulator shown in FIG. 9.

Next, a fifth embodiment of the present invention will be described. FIG. 9 is a plan view showing the configuration of an optical modulator 900 according to the fifth embodiment, FIG. 10 is a side view of the optical modulator 900, and FIG. 11 is a bottom view of the optical modulator 900. It should be noted that, in FIG. 9, for the same configuration element and wall thickness as in the optical modulator 100 according to the first embodiment in FIG. 1, the same reference sign as in FIG. 1 is used, and the description of the above-described optical modulator 100 will be incorporated. In addition, in FIG. 9, in order to facilitate the understanding of the configuration of the optical modulator 900, similar to FIG. 1, the internal structure, which cannot be observed in a state where the optical modulator 900 is completely assembled, is also indicated with solid lines. In addition, in a modulator housing 904 shown in FIG. 9 as well, similar to FIG. 1, it is necessary to understand that the wall thickness of each of the short side walls 920 and 922 and the long side walls 924 and 926 indicates the average wall thickness in each wall.

The optical modulator 900 has the same configuration as the optical modulator 100, but is different in terms of the fact that the modulator housing 904 is provided instead of the modulator housing 104. The modulator housing 904 has, similar to the modulator housing 104, a rectangular shape or a substantially rectangular shape in a plan view and has short side walls 920 and 922, long side walls 924 and 926, and bottom surface wall 928 similar to the short side walls 120 and 122, the long side walls 124 and 126, and the bottom surface wall 128 of the modulator housing 104. However, unlike the outer surface of the bottom surface wall 128, the outer surface of the bottom surface wall 928 includes recess portions 980 and 982 that are recessed in the thickness direction (the vertical direction in the drawing of FIG. 10) of the modulator housing 904 by distances d1 and d2, respectively, with respect to other portions in ranges of distances L1 and L2 that include at least parts of an optical input portion 960 and an optical output portion 962 in a plan view from the end portions that are connected to the short side walls 920 and 922, respectively, in the outer surface (the surface shown in FIG. 11) of the bottom surface wall 928. That is, respective distances t91 and t92 from the upper surface (the upper surface shown in FIG. 10) of the optical modulator 900 to the flat surfaces (the surfaces shown in FIG. 11) of the recess portions 980 and 982 are smaller than a distance t90 from the upper surface to the flat surface other than the recess portions 980 and 982.

The predetermined distances L1 and L2 are desirably selected such that the recess portions 980 and 982 extend as ranges including the optical input portion 960 and the optical output portion 962, respectively. Here, the optical input portion 960 refers to a range from the inner surface of the short side wall 920 to the light input end 152 of the optical modulation element 102, and the optical output portion 962 refers to a range from the inner surface of the short side wall 922 to the light output end 154 of the optical modulation element 102. It should be noted that the distances L1 and L2 may be the same value or may be different from each other. Similarly, the predetermined distances d1 and d2 may be the same value or may be different from each other.

When the optical modulator 900 having the above-described configuration is mounted on a circuit board, due to the recess portions 980 and 982, the portions corresponding to the optical input portion 960 and the optical output portion 962 in the bottom surface of the modulator housing 904 are separated from the circuit board. Therefore, the optical modulator 900 is capable of preventing heat from a heat-generating electronic component from propagating through the circuit board and propagating to the optical input portion 960 and the optical output portion 962 even in a case where the heat-generating electronic component is disposed close to the optical modulator 900 on the circuit board. As a result, in the optical modulator 900, it is possible to further suppress characteristic fluctuations and the degradation of long-term reliability attributed to the disposition of a heat-generating electronic component close to the optical modulator 900.

It should be noted that, in the present embodiment, two recess portions 980 and 982 are provided in the bottom portion of the modulator housing 904, but the configuration is not limited to this configuration. Any one of the recess portion 980 or the recess portion 982 may be provided in the bottom surface wall 928. For example, it is possible to provide a recess portion at, between the two end portions of the bottom surface of the modulator housing 904 that are connected to the short side walls 920 and 922, respectively, only the end portion that comes close to a heat-generating electronic component such as a DSP in a case where the optical modulator 900 is mounted on the circuit board.

Here, in each of the optical modulators 100, 400, 500, 600, 600', and 900 according to the first, second, third, fourth, and fifth embodiments described above, each of the long side walls 124, 424, 524, 624, and 924 corresponds to a first long side wall, and each of the long side walls 126, 426, 526, 626, and 926 corresponds to a second long side wall. In addition, the short side walls 120, 420, 520, 620, and 920 correspond to a first short side wall, and the short side walls 122, 422, 522, 622, and 922 correspond to a second short side wall.

Sixth Embodiment

Figure 12:
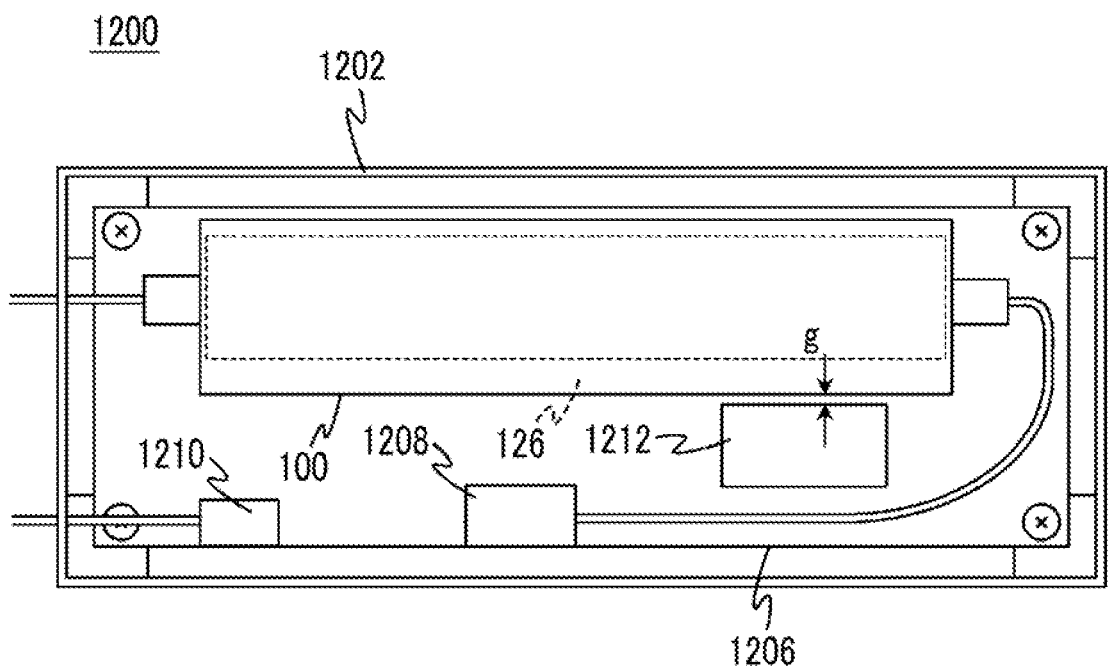
FIG. 12 is a plan view of an optical module according to a sixth embodiment of the present invention.

Next, a sixth embodiment of the present invention will be described. The present embodiment is an optical module mounted with the optical modulator according to the present invention. FIG. 12 is a plan view showing the configuration of an optical module 1200 according to the sixth embodiment.

The optical module 1200 accommodates the optical modulator 100 and a circuit board 1206 in a module housing 1202. In the circuit board 1206, not only the optical modulator 100 is mounted, but a laser diode (LD) 1208, which is a light source of transmission light, and a photo diode (PD) 1210, which is an optical receiver of reception light, are also mounted. In addition, in the circuit board 1206, an electronic component that configures an electronic circuit for operating these optical components is mounted. FIG. 12 shows a DSP 1212 for digital signal processing as an example of an electronic component that is an important electronic component and generates a large amount of heat.

Here, other optical components and electronic components may be mounted on the circuit board 1206 depending on functions required for the optical module 1200. Examples of such electronic components include a driver IC for driving the optical modulator 100 and the like. Therefore, the optical module 1200, for example, outputs signal light (transmission light) to one transmission channel optical fiber (not shown) through the optical modulator 100 and receives an optical signal (reception light) that has been transmitted by a different transmission channel optical fiber (not shown) with the PD 1210.

In the optical module 1200, particularly, the optical modulator 100 is mounted on the circuit board 1206 such that the DSP 1212 is disposed close to the vicinity of the end portion of the second long side wall 126 with a predetermined clearance g between the DSP 1212 and the second long side wall 126. Here, the clearance g is, for example, 2.0 mm.

In the optical module 1200 having the above-described configuration, the optical modulator 100 is mounted such that the DSP 1212, which is a heat-generating electronic component, is disposed in the side of the second long side wall 126 having the wall thickness t3 and reduced thermal resistance, which corresponds to the lower edge of the optical modulator 100 in the drawing. Therefore, in the optical module 1200, even when the DSP 1212, which is a heat-generating electronic component, is disposed close to the optical modulator 100, characteristic fluctuations and the degradation of long-term reliability in the optical modulator 100 attributed to the above-described close disposition are suppressed. As a result, it is possible to maintain the transmission quality of transmission light that is output from the optical module 1200 at a high level while reducing the size of the optical module 1200 and also to suppress the degradation of long-term reliability in the optical module 1200 as a whole.

It should be noted that, in the present embodiment, the optical module 1200 is configured using the optical modulator 100, but the configuration is not limited to this configuration. The optical module 1200 may be configured by disposing the optical modulator 400, 500, 600, 600', or 900 instead of the optical modulator 100 at the same position as the optical modulator 100 on the circuit board 1206 shown in FIG. 12. In this case, the mounting position of the DSP 1212 is desirably not the vicinity of the portion corresponding to the optical input portion 460, 560, 660, or 960 and the optical output portion 462, 562, 662, or 962 in the long side walls 426, 526, 626, 626', or 926.

Seventh Embodiment

Figure 13:
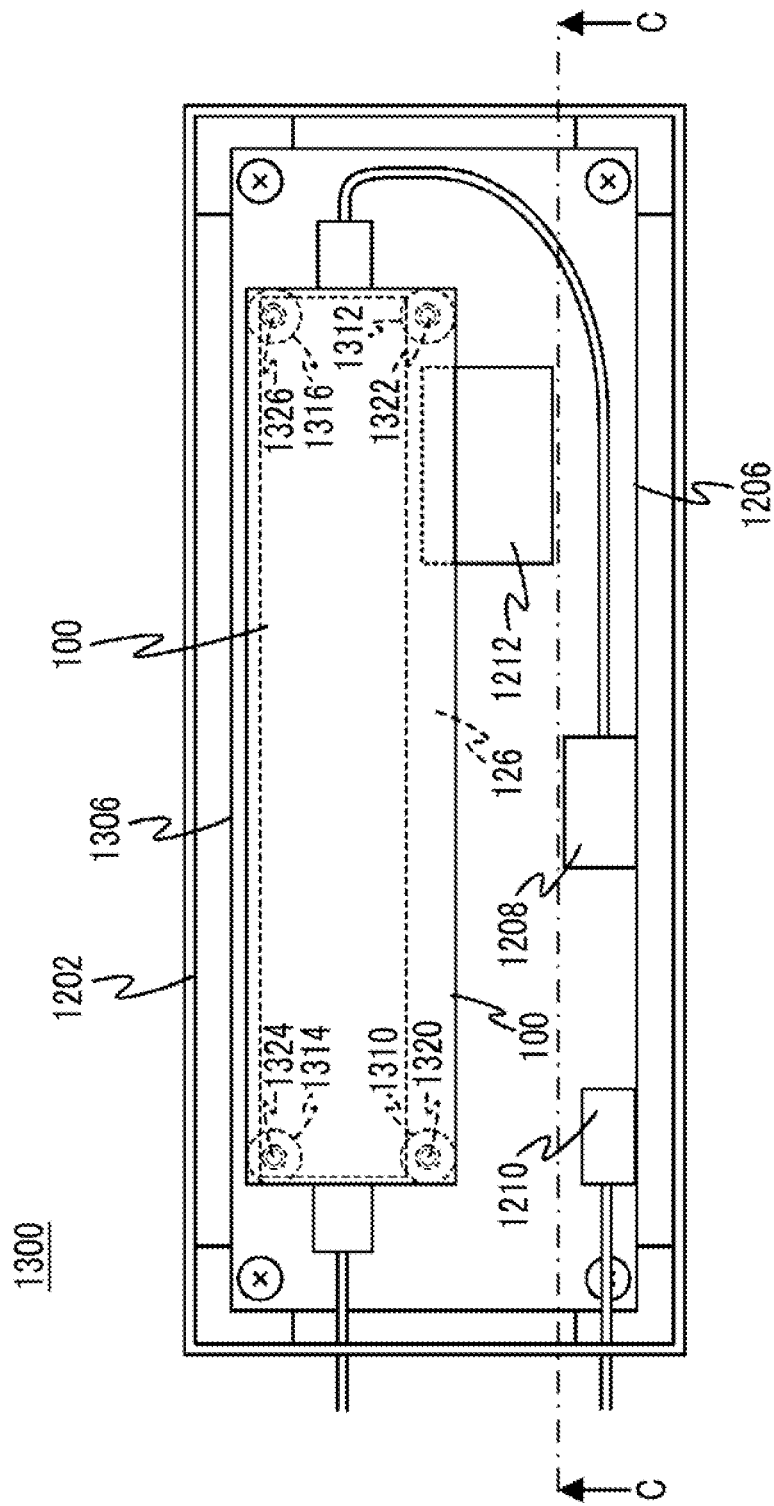
FIG. 13 is a plan view of an optical module according to a seventh embodiment of the present invention.
Figure 14:
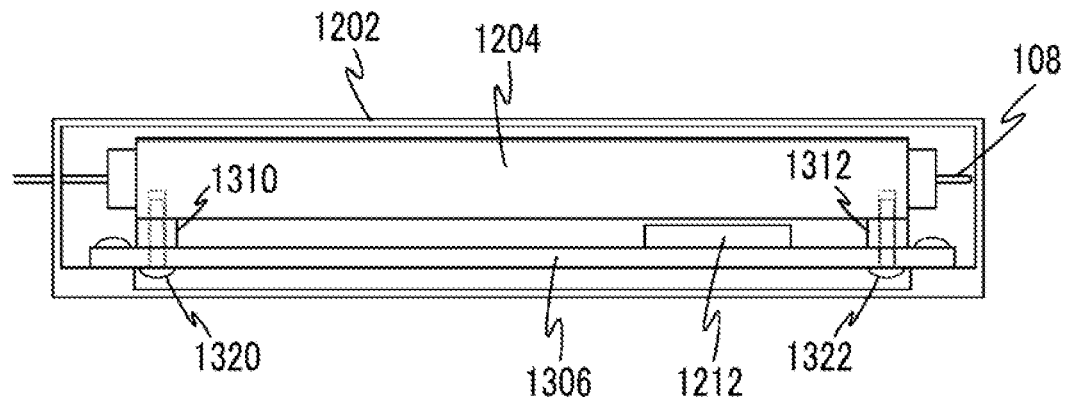
FIG. 14 is a cross-sectional view of the optical module shown in FIG. 13 taken along the line CC.

Next, an optical module according to a seventh embodiment of the present invention will be described. FIG. 13 is a plan view showing the configuration of an optical module 1300 according to the seventh embodiment, and FIG. 14 is a cross-sectional view of the optical module shown in FIG. 13 taken along the line CC. In FIG. 13, for the same configuration element as in the optical module 1200 according to the sixth embodiment shown in FIG. 12, the same reference sign as in FIG. 12 is used, and the description of the above-described optical module 1200 will be incorporated.

The optical module 1300 has the same configuration as the optical module 1200, but is different in terms of the fact that a circuit board 1306 is provided instead of the circuit board 1206. The circuit board 1306 has the same configuration as the circuit board 1206, but is different in terms of the fact that the DSP 1212, which is one electronic component, is disposed in the side of the second long side wall 126 of the optical modulator 100 and a part of the DSP 1212 is disposed to overlap the optical modulator 100 in a plan view. Specifically, the optical modulator 100 is fixed to the circuit board 1306 with four screws 1320, 1322, 1324, and 1326 through four spacers 1310, 1312, 1314, and 1316 having holes into which the screws are inserted, respectively, and a part of the DSP 1212 is mounted in a space secured between the optical modulator 100 and the circuit board 1306 with the spacers 1310, 1312, 1314, and 1316.

In the optical module 1300 having the above-described configuration, similar to the optical module 1200, since heat from the DSP 1212 propagates through the second long side wall 126 having the wall thickness of t3 and reduced thermal resistance in the optical modulator 100, characteristic fluctuations and the degradation of long-term reliability in the optical modulator 100 attributed to the heat from the DSP 1212 are suppressed. As a result, it is possible to maintain the transmission quality of transmission light that is output from the optical module 1300 at a high level while reducing the size of the optical module 1300 and also to suppress the degradation of long-term reliability in the optical module 1300 as a whole.

It should be noted that, in the present embodiment, the entire bottom surface of the optical modulator 100 is separated from the circuit board 1306 with the spacers 1310, 1312, 1314, and 1316 each having a hole through which a screw is inserted, but the configuration is not limited to this configuration. In the gap between the optical modulator 100 and the circuit board 1306, for example, a metal block that is a pure solid blank not provided with a hole through which a screw is inserted or the like is disposed in a region other than the region where the part of the DSP 1212 is mounted or a part of the region, whereby it is possible to cause heat to flow from the optical modulator 100 to the circuit board 1306 through the metal block. Alternatively, the circuit board 1306 may be fixed only to the flat surface portion of the bottom surface not provided with a recess portion by providing the recess portion only in the vicinity including the region where the part of the DSP 1212 is mounted in the bottom surface of the optical modulator 100.

In addition, in the present embodiment, the optical module 1300 is configured using the optical modulator 100, but the configuration is not limited to this configuration. The optical module 1300 may be configured by disposing the optical modulator 400, 500, 600, 600', or 900 instead of the optical modulator 100 at the same position as the optical modulator 100 on the circuit board 1306 shown in FIG. 13. In this case, the mounting position of the DSP 1212 is desirably not the vicinity of the portion corresponding to the optical input portion 460, 560, 660, or 960 and the optical output portion 462, 562, 662, or 962 in the long side walls 426, 526, 626, 626', or 926.

As described above, the optical modulator 100 according to the present invention includes the optical modulation element 102 including the optical waveguides 106 formed on a substrate and the modulator housing 104 that accommodates the optical modulation element 102. The modulator housing 104 has the bottom surface wall 128 having a quadrilateral shape in a plan view, the first long side wall 124 and the second long side wall 126 that are connected to two opposite edges of the bottom surface wall 128, and the first short side wall 120 and the second short side wall 122 that are shorter than the first and second long side walls 124 and 126 and are connected to the other two opposite edges of the bottom surface wall 128. The optical modulation element 102 is accommodated in the space surrounded by the bottom surface wall 128, the first and second long side walls 124 and 126, and the first and second short side walls 120 and 122. In addition, the second long side wall 126 has the wall thickness t3 that is equal to or larger than the wall thickness t2 of the first long side wall 124, and at least one of the first and second short side walls 120 and 122 has the wall thickness t11 or t12 that is thinner than the wall thickness t2 of the first long side wall 124.

According to this configuration, since heat that has flowed in from a part of the modulator housing 104 immediately propagates through the second long side wall 126 having the thickest wall thickness t3 and the smallest thermal resistance, even in a case where the optical modulator 100 is disposed close to a heat source such as an electronic component, it is possible to suppress characteristic fluctuations and the degradation of long-term reliability attributed to the above-described close distribution by suppressing the generation of an asymmetric temperature distribution in the modulator housing 104.

In addition, the optical modulator 600 or 600' has at least one protrusion portion 666 or 870 or the like that extends toward the optical modulation element 102 on the inner surface of the second long side wall 626, 626'. According to this configuration, it is possible to suppress characteristic fluctuations and the degradation of long-term reliability in the optical modulator 600 or 600' attributed to the close disposition of a heat source such as an electronic component by further reducing the thermal resistance of the second long side wall 626, 626' when the second long side wall 626, 626' is seen as a whole.

In addition, in the optical modulator 400, the light input end 152 and the light output end 154 of the optical modulation element 102 face the first short side wall 420 and the second short side wall 422, respectively. In addition, the second long side wall 426 has the wall thicknesses t31 and t32 that are thinner than the wall thickness t2 of the first long side wall 424 in the ranges including at least one of the optical input portion 460 that is the range from the inner surface of the first short side wall 420 to the light input end 152 of the optical modulation element 102 and the optical output portion 462 that is the range from the inner surface of the second short side wall 422 to the light output end 154 of the optical modulation element 102.

According to this configuration, even in a case where a heat source such as an electronic component is disposed close to the optical modulator, it is possible to further suppress characteristic fluctuations and the degradation of long-term reliability in the optical modulator 400 by suppressing the propagation of heat to the portions of the optical input portion 460 and/or the optical output portion 462 to which the optical component such as the capillary 140 or the microlens array 142 is attached in the modulator housing 104.

In addition, in the optical modulator 400, the light input terminal portion 150 that holds the input optical fiber 108 that inputs light to the optical modulation element 102 is fixed to the first short side wall 420, and the light output terminal portion 148 that guides light output from the optical modulation element 102 to the outside of the modulator housing 404 and holds the output optical fiber 110 is fixed to the second short side wall 422. In addition, the optical component such as the capillary 140, the microlens array 142, or the polarization beam combining prism 144 is attached to the light input terminal portion 150 or the light output terminal portion 148, or the optical input portion 460 or the optical output portion 462 of the modulator housing 404.

According to this configuration, it is possible to further suppress characteristic fluctuations and the degradation of long-term reliability in the optical modulator 400 by suppressing the propagation of heat to these optical components.

In addition, in the optical modulator 900, the recess portions 980 and 982 having the flat surfaces that are recessed in the thickness direction by the distances d1 and d2, respectively, with respect to the flat surface of the other portion of the bottom surface wall 928 in the portions of the ranges of the predetermined distances L1 and L2 along the longitudinal direction from the edges that are connected to the first and second short side walls 920 and 922, respectively, are provided in the outer surface of the bottom surface wall 928. However, any one of the recess portions 980 and 982 can be provided in the bottom surface wall 928.

According to this configuration, in a case where the optical modulator 900 is mounted on a circuit board, the portion of the bottom surface wall 928 including the ranges of the optical input portion 960 and/or the optical output portion 962 is separated from the circuit board. Therefore, even in a case where the optical modulator 900 is mounted on the circuit board on which a heat-generating electronic component is mounted, the propagation of heat from the heat-generating electronic component to the optical input portion 960 and/or the optical output portion 962 through the circuit board is suppressed. As a result, the occurrence of characteristic fluctuations and the degradation of long-term reliability in the optical modulator 900 are further suppressed.

In addition, in the optical modulators 100, 400, 500, 600, 600', and 900, the optical modulation element 102 is an interference type optical modulation element that causes light that propagates through, among optical waveguides 106, two optical waveguides extending in the longitudinal direction of the optical modulation element 102 to interfere with each other to perform an operation. According to this configuration, the effect on the above-described optical modulators 100, 400, 500, 600, 600', and 900 are particularly preferably exhibited.

In addition, in the optical modulator 600 or 600', the optical modulation element 102 is an interference type optical modulation element, and at least one protrusion portion 666 or 870 or the like extends toward the optical modulation element 102 in the range including the interference portion that is the portion where the two optical waveguides through which two light rays that are caused to interfere with each other propagate are formed in the second long side wall 626. According to this configuration, it is possible to further suppress the occurrence of characteristic fluctuations and the degradation of long-term reliability in the optical modulator 600 or 600' by suppressing the generation of a temperature gradient attributed to the close disposition of a heat-generating electronic component, particularly, in the interference portion 650 of the optical modulation element 102 that is likely to be a cause for characteristic fluctuations attributed to the generation of a temperature distribution.

In addition, the wall thicknesses t11 and the like, t2, t3, t31 and the like, t4, t51 and the like of the short side wall 120 and the like, the short side wall 122 and the like, the long side wall 124 and the like, the long side wall 126 and the like, and the bottom surface wall 128 and the like in the optical modulators 100, 400, 500, 600, 600', and 900 are the average values of the entire corresponding walls or the average values of the thicknesses of parts of the corresponding walls, respectively. According to this configuration, regardless of the presence of fine protrusions and recesses on the respective walls, it is possible to easily design the modulator housing 104 and the like by regulating the relationships of thermal resistance between the respective walls or the parts of the walls.

In addition, the present invention is the optical modules 1200 and 1300 in which the optical modulators 100, 400, 500, 600, 600', or 900 and an electronic component such as the DSP 1212, which is a heating element, are used. According to this configuration, it is possible to configure a smaller optical module by disposing the optical modulator 100 or the like and a heat-generating electronic component such as the DSP 1212 close to each other without causing characteristic fluctuations or the degradation of long-term reliability in the optical modulator 100 or the like.

In addition, in the optical module 1200, the DSP 1212 is disposed in the side of the optical modulator 100 where the second long side wall 126 is present as at least one electronic component, which is a heating element. According to this configuration, it is possible to effectively suppress the occurrence of characteristic fluctuations and the degradation of long-term reliability in the optical modulator 100 by immediately guiding heat from the DSP 1212 that is a heat-generating electronic component to the second long side wall 126 having small thermal resistance.

In addition, in the optical module 1300, the DSP 1212 is disposed on the second long side wall 126 side of the optical modulator 100 as at least one electronic component, which is a heating element, such that a part of the DSP 1212 overlaps the optical modulator 100 in a plan view. According to this configuration, it is possible to effectively suppress the occurrence of characteristic fluctuations and the degradation of long-term reliability in the optical modulator 100 by immediately guiding heat from the DSP 1212 that is a heat-generating electronic component to the second long side wall 126 having small thermal resistance.

REFERENCE SIGNS LIST

100, 400, 500, 600, 600', 900 . . . Optical modulator
102, 1502 . . . Optical modulation element
104, 404, 504, 604, 604', 904 . . . Modulator housing
106 . . . Optical waveguide
108, 1508 . . . Input optical fiber
110, 1510 . . . Output optical fiber
120, 122, 420, 422, 520, 522, 620, 622 . . . Short side wall
124, 126, 424, 426, 624, 626, 924, 926 . . . Long side wall
128, 428, 528, 628, 928 . . . Bottom surface wall
130, 1520 . . . Center line with respect to width direction
132, 1522 . . . Center line with respect to longitudinal direction
140 . . . Capillary
142 . . . Microlens array
144 . . . Polarization beam combining prism
146 . . . Lens
148 . . . Light output terminal portion
150 . . . Light input terminal portion
152 . . . Light input end 154 . . . Light output end
160 . . . Cover
460, 560, 660, 960 . . . Optical input portion
462, 562, 662, 962 . . . Optical output portion
664, 666, 870, 872, 874 . . . Protrusion portion
980, 982 . . . Recess portion
1200, 1300 . . . Optical module
1206, 1306, 1602 . . . Circuit board
1208 . . . LD
1210 . . . PD
1212, 1600 . . . DSP
1310, 1312, 1314, 1316 . . . Spacer
1320, 1322, 1324, 1326 . . . Screw

The invention claimed is:

1. An optical module, comprising:
an electronic component which is a heating element; and
an optical modulator in which an optical modulation element including optical waveguides formed on a substrate is accommodated in a modulator housing,
wherein the modulator housing has a bottom surface wall having a quadrilateral shape in a plan view, a first long side wall and a second long side wall that are connected to two opposite edges of the bottom surface wall, and a first short side wall and a second short side wall that are shorter than the first long side wall and the second long side wall and are connected to two other opposite edges of the bottom surface wall,
the optical modulation element is accommodated in a space surrounded by the bottom surface wall, the first long side wall and the second long side wall, and the first short side wall and the second short side wall,
the optical modulation element is an interference type optical modulation element having an interference portion that interferes two lights with each other that propagate through two optical waveguides, respectively, each extending in a longitudinal direction of the optical modulation element,
the second long side wall is a long side wall that is disposed closer to the electronic component than the first long side wall, and a wall thickness of a portion of the second long side wall in a range corresponding to the interference portion along the longitudinal direction is larger than a wall thickness of an other portion of the second long side wall and a wall thickness of the first long side wall, and
at least one of the first short side wall and the second short side wall has a wall thickness that is thinner than the wall thickness of the first long side wall.

2. The optical module according to claim 1, further comprising:
at least one protrusion portion that extends toward the optical modulation element on an inner surface of the first long side wall or the second long side wall.

3. The optical module according to claim 1,
wherein a light input end and a light output end of the optical modulation element face the first short side wall and the second short side wall, respectively, and
the second long side wall has a wall thickness that is thinner than the wall thickness of the first long side wall in a range including at least one of an optical input portion that is a range from an inner surface of the first short side wall to the light input end of the optical modulation element and an optical output portion that is a range from an inner surface of the second short side wall to the light output end of the optical modulation element.

4. The optical module according to claim 3,
wherein a light input terminal portion that holds an input optical fiber that inputs light to the optical modulation element is fixed to the first short side wall,
a light output terminal portion that holds an output optical fiber that guides light output from the optical modulation element to an outside of the modulator housing is fixed to the second short side wall, and
an optical component is attached to the light input terminal portion or the light output terminal portion, or an optical component is attached to the optical input portion or the optical output portion of the modulator housing.

5. The optical module according to claim 1,
wherein a recess portion is provided on an outer surface of the bottom surface wall within a predetermined distance range along the longitudinal direction from at least one of edges of the outer surface of the bottom surface wall that are connected to the first short side wall and the second short side wall.

6. The optical module according to claim 2,
wherein the at least one protrusion portion extends toward the optical modulation element in a region on the first long side wall or the second long side wall, the region including a range where the two optical waveguides of the optical modulation element are formed.

7. The optical module according to claim 1,
wherein the wall thickness is defined as an average value of a thickness of a part or an entirety of each corresponding wall.

8. The optical module according to claim 1,
wherein the optical modulator and the electronic component are mounted on a circuit board, and
the electronic components is disposed on a side of the second long side wall of the modulator housing and partly overlapping the modulator housing in a plan view.

* * * * *